(12) United States Patent
Cooks et al.

(10) Patent No.: US 9,551,079 B2
(45) Date of Patent: Jan. 24, 2017

(54) SYSTEMS AND METHODS FOR PRODUCING METAL CLUSTERS; FUNCTIONALIZED SURFACES; AND DROPLETS INCLUDING SOLVATED METAL IONS

(71) Applicants: Purdue Research Foundation, West Lafayette, IN (US); The Trustees of The University of Pennsylvania, Philadelphia, PA (US)

(72) Inventors: Robert Graham Cooks, West Lafayette, IN (US); Anyin Li, West Lafayette, IN (US); Qingjie Luo, Philadelphia, PA (US)

(73) Assignee: Purdue Research Foundation, West Lafayette, IN (US)

( * ) Notice: Subject to any disclaimer, the term of this patent is extended or adjusted under 35 U.S.C. 154(b) by 365 days.

(21) Appl. No.: 14/468,549

(22) Filed: Aug. 26, 2014

(65) Prior Publication Data

US 2015/0075998 A1   Mar. 19, 2015

Related U.S. Application Data

(60) Provisional application No. 61/880,219, filed on Sep. 20, 2013, provisional application No. 61/877,528, (Continued)

(51) Int. Cl.
*B01J 19/08* (2006.01)
*B05D 1/04* (2006.01)
(Continued)

(52) U.S. Cl.
CPC . *C25C 7/00* (2013.01); *C25C 1/22* (2013.01); *Y02P 10/234* (2015.11)

(58) Field of Classification Search
CPC ....... B01J 19/087; B05B 5/0255; B05B 5/087; B05D 1/04
(Continued)

(56) References Cited

U.S. PATENT DOCUMENTS 6,294,217 B1 * 9/2001 Risen, Jr. ................ C03C 17/25
257/E21.26
6,348,431 B1 * 2/2002 Even, Jr. ................ B01J 37/031
502/325

(Continued)

OTHER PUBLICATIONS

Giljohann, D. A.; Seferos, D. S.; Daniel, W. L.; Massich, M. D.; Patel, P. C.; Mirkin, C. A.: Gold Nanoparticles for Biology and Medicine. Angew. Chem., Int. Ed. 49, 3280-3294.(2010).
(Continued)

*Primary Examiner* — David A Vanore
(74) *Attorney, Agent, or Firm* — Brown Rudnick LLP; Adam M. Schoen

(57) ABSTRACT

The invention generally relates to systems and methods for producing metal clusters; functionalized surfaces; and droplets including solvated metal ions. In certain aspects, the invention provides methods that involve providing a metal and a solvent. The methods additionally involve applying voltage to the solvated metal to thereby produce solvent droplets including ions of the metal containing compound, and directing the solvent droplets including the metal ions to a target. In certain embodiments, once at the target, the metal ions can react directly or catalyze reactions.

18 Claims, 25 Drawing Sheets

Related U.S. Application Data filed on Sep. 13, 2013, provisional application No. 62/012,619, filed on Jun. 16, 2014.

(51) Int. Cl.
  *C25C 7/00* (2006.01)
  *C25C 1/22* (2006.01)

(58) Field of Classification Search
  USPC ......... 250/281, 282, 290, 292, 294; 427/123
  See application file for complete search history.

(56) References Cited

U.S. PATENT DOCUMENTS

| | | | |
|---|---|---|---|
| 7,361,311 B2 | 4/2008 | Cooks et al. | |
| 7,679,052 B2* | 3/2010 | Blanchard | B03C 7/02 250/281 |
| 7,732,225 B2* | 6/2010 | Hanson | G01N 1/40 134/1.3 |
| 8,051,800 B2* | 11/2011 | Kawakami | B05B 5/0255 118/629 |
| 2012/0012453 A1* | 1/2012 | Rehman | B01J 19/087 204/173 |
| 2015/0075998 A1* | 3/2015 | Cooks | C25C 7/00 205/568 |
| 2015/0295226 A1* | 10/2015 | Kisailus | H01M 4/131 429/231.95 |

OTHER PUBLICATIONS

Allgeier, A. M.; Mirkin, C. A.: Ligand Design for Electrochemically Controlling Stoichiometric and Catalytic Reactivity of Transition Metals. Angew. Chem., Int. Ed. 37, 894-908.(1998).

Ahmadi, T. S.; Wang, Z. L.; Green, T. C.; Henglein, A.; ElSayed, M. A.: Shape-Controlled Synthesis of Colloidal Platinum Nanoparticles. Science 272, 1924-1926.(1996).

Shevchenko, E. V.; Talapin, D. V.; Kotov, N. A.; O'Brien, S.; Murray, C. B.: Structural Diversity in Binary Nanoparticle Superlattices. Nature 439, 55-59.(2006).

Zhu, M.; Aikens, C. M.; Hollander, F. J.; Schatz, G. C.; Jin, R.: Correlating the Crystal Structure of a Thiol-Protected Au25 Cluster and Optical Properties. J. Am. Chem. Soc. 130, 5883-5885.(2008).

Lu, X. M.; Rycenga, M.; Skrabalak, S. E.; Wiley, B.; Xia, Y. N.: Chemical Synthesis of Novel Plasmonic Nanoparticles. Annu. Rev. Phys. Chem. 60, 167-192.(2009).

Yanson, A. I.; Rodriguez, P.; Garcia-Araez, N.; Mom, R. V.; Tichelaar, F. D.; Koper, M. T. M.: Cathodic Corrosion: A Quick, Clean, and Versatile Method for the Synthesis of Metallic Nanoparticles. Angewandte Chemie International Edition 50, 6346-6350.(2011).

Amoruso, S.; Ausanio, G.; Bruzzese, R.; Vitiello, M.; Wang, X.: Femtosecond Laser Pulse Irradiation of Solid Targets as a General Route to Nanoparticle Formation in a Vacuum. Phys. Rev. B 71.(2005).

Sylvestre, J. P.; Kabashin, A. V.; Sacher, E.; Meunier, M.: Femtosecond Laser Ablation of Gold in Water: Influence of the Laser-Produced Plasma on the Nanoparticle Size Distribution. Applied Physics a-Materials Science & Processing 80, 753-758.(2005).

Xiong, Y.; Washio, I.; Chen, J.; Sadilek, M.; Xia, Y. N.: Trimeric Clusters of Silver in Aqueous Agno3 Solutions and Their Role as Nuclei in Forming Triangular Nanoplates of Silver. Angew. Chem., Int. Ed. 46, 4917-4921.(2007).

Khairallah, G. N.; O'Hair, R. A.: Gas-Phase Synthesis of [Ag4h]+ and Its Mediation of the C—C Coupling of Allyl Bromide. Angew. Chem. Int. Ed. Engl. 44, 728-731.(2005).

Zavras, A.; Khairallah, G. N.; Connell, T. U.; White, J. M.; Edwards, A. J.; Donnelly, P. S.; O'Hair, R. A.: Synthesis, Structure and Gas-Phase Reactivity of a Silver Hydride Complex [Ag3 {(Pph2 )2 Ch2 }3 (Mu3—H)(Mu3—Cl)]Bf4. Angew. Chem. Int. Ed. Engl. 52, 8391-8394.(2013).

Faraday, M.: The Bakerian Lecture: Experimental Relations of Gold (and Other Metals) to Light. Philosophical Transactions of the Royal Society of London 147, 145-181.(1857).

S. Eustis, M. A. El-Sayed, "Why gold nanoparticles are more precious than pretty gold: noble metal surface plasmon resonance and its enhancement of the radiative and nonradiative properties of nanocrystals of different shapes" Chem. Soc. Rev. 2006, 35, 209-217.

N. L. Rosi, C. A. Mirkin, "Nanostructures in biodiagnostics." Chem. Rev. 2005, 105, 1547-1562.

P. K. Jain, X. H. Huang, I. H. El-Sayed, M. A. El-Sayed, "Noble metals on the nanoscale: optical and photothermal properties and some applications in imaging, sensing, biology, and medicine." Acc. Chem. Res. 2008, 41, 1578-1586.

J. D. Biggs,et al. "Two-dimensional stimulated resonance Raman spectroscopy of molecules with broadband x-ray pulses", J. Chem. Phys. 2012, 136.

K. Kneipp, et al. "Ultrasensitive Chemical Analysis by Raman Spectroscopy", Chem. Rev. 1999, 99, 2957.

D. L. Jeanmaire, R. P. Van Duyne, Journal of Electroanalytical Chemistry and Interfacial Electrochemistry 1977, 84, 1-20.

H. Wang, Z. D. Schultz, "The Chemical Origin of Enhanced Signals From Tip-Enhanced Raman Detection of Functionalized Nanoparticles" Analyst 2013, 138, 3150-3157.

R. M. Stockle, Y. D. Suh, V. Deckert, R. Zenobi, Chem. Phys. Lett. 2000, 318, 131-136.

E. Hao, G. C. Schatz, "Electromagnetic fields around silver nanoparticles and dimers." J. Chem. Phys. 2004, 120, 357-366.

D. A. Genov, A. K. Sarychev, V. M. Shalaev, A. Wei, "Resonant Field Enhancements from Metal Nanoparticles Arrays," Nano Lett. 2004, 4, 153-158.

P. Negri, R. J. Flaherty, O. O. Dada, Z. D. Schultz, "Ultrasensitive Online SERS Detection of Structural Isomers Separated by Capillary Zone Electrophoresis" Chem. Commun. 2014, 50, 2707-2710.

T. T. Nge, M. Nogi, K. Suganuma, Journal of Materials Chemistry C 2013, 1, 5235-5243.

J. F. Li, et al. "Shell-isolated nanoparticle-enhanced Raman spectroscopy.", Nature 2010, 464, 392-395.

J. Wang, L. Yang, B. Liu, H. Jiang, R. Liu, J. Yang, G. Han, Q. Mei, Z. Zhang, Anal. Chem. 2014.

Y. N. Xia, J. A. Rogers, K. E. Paul, G. M. Whitesides, "Unconventional Methods for Fabricating and Patterning Nanostructures." Chem. Rev. 1999, 99, 1823-1848.

D. R. Baer, et al. "Surface characterization of nanomaterials and nanoparticles: Important needs and challenging opportunities.", Journal of Vacuum Science & Technology A 2013, 31.

K. D. Osberg, et al. "Dispersible Surface-Enhanced Raman Scattering Nanosheets", Adv. Mater. 2012, 24, 6065-70.

J. Cyriac, et al. "In situ Raman spectroscopy of surfaces modified by ion soft landing.", Analyst 2012, 137, 1363-1369.

N. G. Greeneltch, et al. "Immobilized Nanorod Assemblies: Fabrication and Understanding of Large Area Surface-Enhanced Raman Spectroscopy Substrates", Anal. Chem. 2013, 85, 2297-2303.

S. Rauschenbach, et al., "Electrospraylon Beam Deposition of Clusters and Biomolecules", Small 2006, 2, 540-547.

G. E. Johnson,et al., "Coverage-Dependent Charge Reduction of Cationic Gold Clusters on Surfaces Prepared Using Soft Landing of Mass-Selected Ions" , J. Phys. Chem. C 2012, 116, 24977-24986.

Y. Lei,et al., "Increased Silver Activity for Direct Propylene Epoxidation via Subnanometer Size Effects", Science 2010, 328, 224-228.

J. Cyriac,et al., "Low-Energy Ionic Collisions at Molecular Solids", Chem. Rev. 2012, 112, 5356-5411.

A. Li, et al., "Synthesis and Catalytic Reactions of Nanoparticles formed by Electrospray Ionization of Coinage Metals", Angew. Chem., Int. Ed. 2014, 53, 3147-3150.

S. M. Asiala, et al. "Characterization of Hotspots in a Highly Enhancing SERS Substrate", Analyst 2011, 136, 4472-4479.

T. R. Jensen, M. D. Malinsky, C. L. Haynes, R. P. Van Duyne, J Phys Chem B 2000, 104, 10549-10556.

(56) References Cited

OTHER PUBLICATIONS

O. Hadjar, et al. "IonCCD™ for direct position-sensitive charged-particle detection: from electrons and keV ions to hyperthermal biomolecular ions.", J. Am. Soc. Mass Spectrom. 2011, 22, 612-623.

Y. Fang, et al. "Measurement of the distribution of site enhancements in surface-enhanced Raman scattering", Science 2008, 321, 388-392.

I. Chakraborty, S. Bag, U. Landman, T. Pradeep, Journal of Physical Chemistry Letters 2013, 4, 2769-2773.

J. W. Kim, Y. Yamagata, B. J. Kim, T. Higuchi, Journal of Micromechanics and Microengineering 2009, 19.

J. Ju, Y. Yamagata, T. Higuchi, "Thin-Film Fabrication Method for Organic Light-Emitting Diodes Using Electrospray Deposition" Adv. Mater. 2009, 21, 4343-4347.

A. K. Badu-Tawiah et al, "Ambient ion soft landing.", Anal. Chem. 2011, 83, 2648-2654.

A. K. Badu-Tawiah, et al. "Peptide Cross-Linking at Ambient Surfaces by Reactions of Nanosprayed Molecular Cations", Angew. Chem. 2012, 124, 9551-9555.

J. C. Hulteen, R. P. Vanduyne,"Nanosphere Litography: A materials general fabrication process for periodic particle array surfaces" J. Vac. Sci. Technol. A 1995, 13, 1553-1558.

Z. Baird, W. P. Peng, R. G. Cooks, "Ion transport and focal properties of an ellipsoidal electrode operated at atmospheric pressure" Int. J. Mass Spectrom. 2012, 330, 277-284.

K. V. G. K. Murty, M. Venkataramanan, T. Pradeep, "Self-assembled Monolayers of 1,4-Benzenedimethanethiol on Polycrystalline Silver and Gold Films: An Investigation of Structure, Stability, Dynamics and Reactivity" Langmuir 1998, 14, 5446-5456.

X. M. Lu, et al. "Mechanistic studies on the galvanic replacement reaction between multiply twinned particles of Ag and HAuCl4 in an organic medium", J. Am. Chem. Soc. 2007, 129, 1733-1742.

M. C. Liu, et al. "Transformation of Pd nanocubes into octahedra with controlled sizes by maneuvering the rates of etching and regrowth" J. Am. Chem. Soc. 2013, 135, 11752-11755.

Bootharaju et al., Rsc Advances 2, 10048, 2012.

Stiles et. al. "Surface-enhanced Raman spectroscopy." Annu. Rev. Anal. Chem. 1, 601-26, 2008.

Dieringer et al. "Surface-enhanced Raman excitation spectroscopy of a single rhodamine 6G molecule." J. Am. Chem. Soc. 131, 849-54, 2009.

Kleinman et al. "Single-molecule surface-enhanced Raman spectroscopy of crystal violet isotopologues: theory and experiment." J. Am. Chem. Soc. 133, 4115-22, 2011.

\* cited by examiner

PRIOR ART

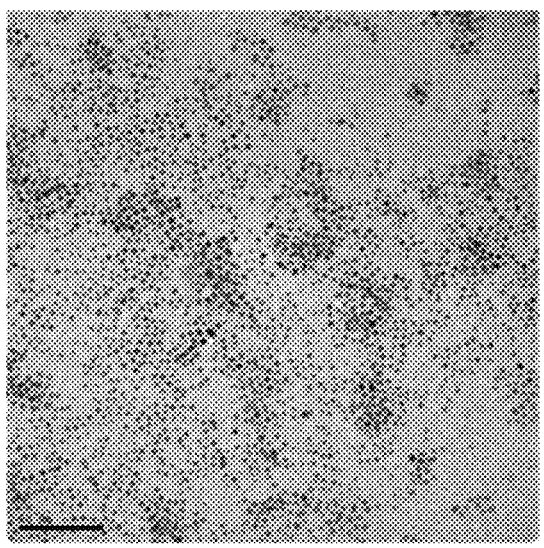 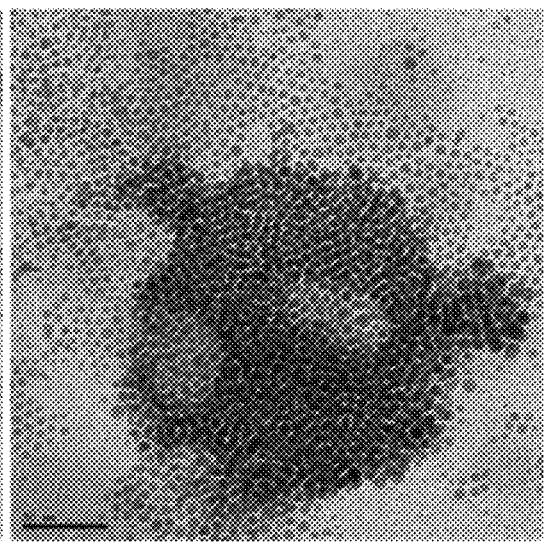
FIG. 4A  FIG. 4B
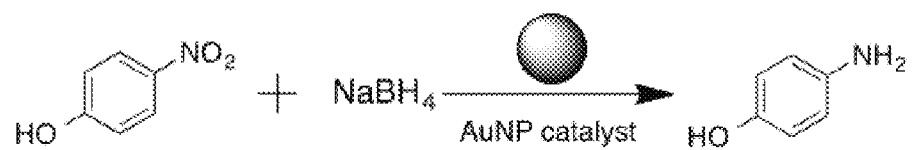
FIG. 5

PRIOR ART

SYSTEMS AND METHODS FOR PRODUCING METAL CLUSTERS; FUNCTIONALIZED SURFACES; AND DROPLETS INCLUDING SOLVATED METAL IONS

RELATED APPLICATIONS

The present application claims the benefit of and priority to each of U.S. provisional application Ser. No. 61/877,528, filed Sep. 13, 2013, U.S. provisional application Ser. No. 61/880,219, filed Sep. 20, 2013, and U.S. provisional application Ser. No. 62/012,619, filed Jun. 16, 2014, the content of each of which is incorporated by reference herein in its entirety.

GOVERNMENT SUPPORT

This invention was made with government support under DE-FG02-06ER15807 awarded by the U.S. Department of Energy. The government has certain rights in the invention.

FIELD OF THE INVENTION

The invention generally relates to systems and methods for producing metal clusters; functionalized surfaces; and droplets including solvated metal ions.

BACKGROUND

In recent years, metallic nanoparticles and metal clusters have been embraced by industrial sectors due to their applications in the field of electronic storage systems, optics and medical imaging, biotechnology, magnetic separation and pre-concentration of target analytes, targeted drug delivery, and vehicles for gene and drug delivery. Generally, a nanoparticle (or nanopowder or nanocluster or nanocrystal) is a small object that behaves as a whole unit in terms of its transport and properties. Typically, such particles have at least one dimension less than 100 nm. Generally, a cluster is an ensemble of bound atoms intermediate in size between a molecule and a bulk solid. A metal cluster contains a group of two or more metal atoms in which direct and substantial metal-metal bonding is present.

The adoption of this technology is hindered by the difficulties associated with producing metallic nanoparticles and metal clusters. For example, there is no existing process that allows for the direct production of metallic nanoparticles from a starting metal. The typical production process employs a strong acid to oxidize the starting metal to produce a precursor metallic salt. That metallic salt is then purified and isolated. The purified and isolated metallic salt is then chemically reduced using reducing agents (such as $NaBH_4$) in bulk solution in the presence of capping ligands to produce the metal nanoparticles. The existing process is complex, requiring multiple separate reactions, in separate reaction steps, and is costly.

Metal clusters are traditionally produced in vacuum using laser ablation. A laser is applied to a metal target to vaporize the metal under vacuum, thereby producing metal cluster ions. The metal cluster ions are then contacted to a chemical reducing agent to reduce the metal cluster ions to neutral metal clusters. The existing process is costly, requiring expensive lasers and vacuum chambers, and also requires chemical reducing agents. Those processes that do operate at atmospheric pressure are difficult to control.

SUMMARY

In certain aspects, the invention generally relates to systems and methods for producing droplets including solvated metal ions. The metal can be separated from the droplet as a nanoparticle and can be generated in situ and react in situ. This aspect of invention provides systems and methods for producing metallic nanoparticles directly for a starting metal. Aspects of the invention are accomplished using solvent and ligand aided spray ionization of metals. Metals are directly ionized using appropriate solvents to produce droplets that include solvated metal ions. The droplets including the solvated metal ions are directed to a reactive surface where the solvated metal ions are reduced to form the metallic nanoparticles. In that manner, systems and methods of the invention, eliminate the need for metallic salt precursors, dramatically simplifying the process of producing metallic nanoparticles.

In certain embodiments, the invention provides methods for providing droplets including solvated metal ions. The methods may involve contacting a metal (e.g., a noble metal) metal-containing compound with a solvent and applying voltage to produce solvent droplets that include the solvated metal ions. The solvent droplets including the solvated metal ions are then directed to a target. The solvent droplets may be directed to the target by an electric field, such as the field generated by the voltage source that applies voltage to the metal containing compound. The solvent droplets may also be directed to the target by a gas flow. In certain embodiments, both an electric field and a gas flow are used to direct the solvent droplets to the target.

Generally, the target is a reactive surface. The invention encompasses numerous types of reactive surfaces. For example the reactive surface may be a surface that includes a cathode, with or without a cathode solvent. In such embodiments, interaction of the solvated metal ions with the cathode reduces the solvated metal ions to a neutral state. In other embodiments, the reactive surface is a surface that includes a reducing reagent.

In certain embodiments, interaction of the solvated metal ions in the droplets with the reactive surface generates at least one metal containing product, such as a metallic nanoparticle. In certain embodiments, methods of the invention further involve contacting a capping ligand to the metal ions on the reactive surface to stabilize and protect the nanoparticle.

While exemplified for production of metallic nanoparticles, aspects of the invention have other applications. Accordingly, while the target is a reactive surface is certain embodiments, the target is not limited to being a reactive surface. For example, the target may be an analytical instrument, such as a mass spectrometer. In those embodiments, the solvent droplets including the solvated metal ions are directed into the analytical instrument for analysis. After analysis the metal ions may still be collected, for example on a surface. These embodiments also allow selection of a subset of metal ions for collection. In other embodiments, the target is a reaction mixture. In those embodiments, the droplets including the solvated metal ions are directed into the reaction mixture. In certain embodiments, contact of the solvated metal ions to the reaction mixture catalyzes a reaction in the reaction mixture.

Other embodiments of the invention provide methods for producing metal containing nanoparticles. Those methods involve providing a metal containing anode in contact with a solvent, applying voltage to the anode, thereby producing solvent droplets comprising solvated metal ions, directing the solvent droplets comprising the solvated metal ions to a reactive surface, in which interaction of the metal ions with the reactive surface produces metal containing nanoparticles.

Still other embodiments of the invention provide systems for producing metal containing nanoparticles. Those systems may include a droplet emitter including a metal containing anode and a solvent vessel operably coupled to the anode, a high voltage source coupled to the droplet emitter, and a reactive surface positioned to receive droplets including solvated metal ions produced by the droplet emitter. The reactive surface is functionalized to reduce solvated metal ions that interact with the surface to thereby produce metal containing nanoparticles on the surface. Systems of the invention may further include the solvent within the solvent vessel. In certain embodiments, the system further includes a gas flow generating device that is operably coupled to the droplet emitter. In certain embodiments, the reactive surface includes a cathode. In other embodiments, the reactive surface includes a reducing agent. In certain embodiments, the reactive surface includes both a cathode and a reducing agent.

In other aspects, the invention generally relates to systems and methods for producing metal cluster ions at atmospheric pressure, thereby allowing neutral clusters to be generated. The invention provides systems and methods for direct and controllable synthesis of metal clusters at atmospheric pressure without the need for chemical reducing agents. The methods of the invention allow for cluster sizes to be measured and conditions to be adjusted in order to change the size of the produced metal cluster. Such aspects of the invention are accomplished using spray ionization of metal salts. First, a solution phase of metal salt clusters is sprayed, generating neutral as well as charged clusters. The solvent is evaporated to give a charged salt cluster which is heated to remove the anionic portion leaving a naked metal cluster cation. The metal cluster ions may be, although not required, directed to a surface where the metal cluster ions are reduced to form the metal clusters, which may occur at atmospheric pressure or under vacuum. In that manner, systems and methods of the invention eliminate the need for chemical reducing agents, lasers and vacuums, thereby dramatically simplifying the process of producing metal clusters and allowing them to be utilized in air.

In certain embodiments, the invention provides methods for producing metal cluster ions at atmospheric pressure. Methods of the invention involve applying voltage and heat to a metal salt (such as a noble metal salt) at atmospheric pressure to thereby ionize the metal salt and produce metal cluster ions. The metal cluster ions are then directed to a target. The metal cluster ions may be directed to the target by an electric field, such as the field generated by the voltage source that applies voltage to the metal salt. The metal cluster ions may also be directed to the target by a gas flow. In certain embodiments, both an electric field and a gas flow are used to direct the metal cluster ions to the target. A heat source is used to heat the metal salt. The heat source may be a heat coil or other type of heat source, such as a heated chamber. Alternatively, a directed heat source, such as a heat gun that can generate and directed a heated gas flow, may be used to heat the metal salt. In certain embodiments, the metal salt is taken up in a solvent as the first step in metal cluster formation. In certain embodiments, the metal cluster ions react with the solvent.

The target may be at atmospheric pressure or under vacuum. Generally, the target is a surface, and in certain embodiments, the surface is functionalized to be a reactive surface. The invention encompasses numerous types of reactive surfaces. For example the reactive surface is a surface that includes a reducing reagent. In such embodiments, interaction of the metal cluster ions with the reactive surface reduces the metal cluster ions to a neutral state. The metal clusters can be naked or unprotected metal clusters. Alternatively, the metal clusters may be protected metal clusters. In embodiments that produce a protected metal clusters, methods of the invention further involve contacting a capping ligand to the metal cluster ions on the surface to stabilize and protect the metal cluster.

While exemplified for production of metal clusters, aspects of the invention have other applications. Accordingly, while the target is a surface is certain embodiments, the target is not limited to being a surface. For example, the target may be an analytical instrument, such as a mass spectrometer. In those embodiments, the metal cluster ions are directed into the analytical instrument for analysis. After analysis the metal cluster ions may still be collected, for example on a surface. These embodiments also allow selection of a subset of metal cluster ions for collection. An exemplary system uses quadrupole filters to select wide mass ranges appropriate to individual sizes of clusters of interest. In certain embodiments, the analytical instrument is used to optimize conditions that favor certain metal cluster sizes or ranges of sizes.

In other embodiments, the target is a reaction mixture. In those embodiments, the metal cluster ions are directed into the reaction mixture, which may be in an ambient environment. In certain embodiments, contact of the metal cluster ions to the reaction mixture catalyzes a reaction in the reaction mixture.

Another embodiment of the invention provides systems for producing metal clusters. Systems of the invention include a droplet emitter at atmospheric pressure, a high voltage source coupled to the droplet emitter, a heating element operably coupled to the droplet emitter, and a surface positioned to receive metal cluster ions produced by the droplet emitter in which deposition of the metal cluster ions of the surface produces metal clusters. In certain embodiments, the surface is at atmospheric pressure. In other embodiments, the surface is under vacuum. In certain embodiments, the system further includes a solvent vessel containing a solvent in which the solvent vessel is operably coupled to the droplet emitter. In certain embodiments, the system further includes a gas flow generating device that is operably coupled to the droplet emitter. In certain embodiments, the system further includes a mass analyzer positioned between the droplet emitter and the surface. The mass analyzer allows for spatial selective soft landing of the metal cluster ions onto the surface.

BRIEF DESCRIPTION OF THE DRAWINGS

FIGS. 4A-4B are transmission electron microscopy images of prepared gold (FIG. 4A) and silver (FIG. 4B) nanoparticles in less than 5 minutes. (The scale bar is 50 nm.) The sizes, shapes and dispersity of the nanoparticles can be controlled by altering the nature of the ligands and the experimental conditions.

FIG. 5 is a drawing illustrating the reduction of 4-nitrophenol by NaBH$_4$ using gold nanoparticles as catalyst. This is reaction is widely used to probe the surface reactivity of synthesized nanoparticles.

FIG. 6 panels A-D are graphs showing overlays of UV-vis spectra of the nitrophenol reaction mixture monitored every 30 seconds. The major peak at 400 nm corresponds to the n→π* transition of 4-nitrophenol anion and its decrease in (panel B) and (panel D) represents the progress of the reduction. (Panel A), Without AuNP, the reaction did not proceed at all in 12 hours. (Panel B) Adding off-line prepared electrosprayed AuNP into the reaction system, the reaction was complete within 30 minutes. (Panel D) Online addition of Au$^+$ ions, instead of AuNP, sprayed into the reaction mixture at the rate of 10 nA while UV-vis was monitored. This extremely small amount of gold catalyzed the reduction reaction. (Panel C) Control experiment that sprays protic solvents to the reaction mixture to prove that the reaction is not influenced by cathodic electron currents.

FIG. 15 panel B shows MS$^2$ of m/z 384 confirming the ligation of 1 isopropyl alcohol. FIG. 15 panel C shows MS$^2$ of m/z 443 and FIG. 15 panel D shows MS$^3$ of m/z 384 confirming the ligation of two metal ligands.

FIG. 18 panel B is a bright field image of AgNP patterns created using a floated stainless steel mesh, the pattern is composed of 20 μm diameter circles of AgNP. Black spots are dust from the ambient air. FIG. 18 panel C shows that a similar AgNP pattern was created on top of copper foil and each spot was SERS active. FIG. 18 panel D shows that when imaged by Raman, signal of the dropcast (3 mm circle) crystal violet sample can only be observed in the AgNP regions. The scale bar in (d) is 10 μm. Note that the nanoparticle spot (20 microns) is about 5 times smaller than the aperture (90 microns) due to autofocussing by charge buildup on the insulating aperture.

FIG. 24 panel B is an image showing that using a perforated plastic tape (50 μm thick, ~500 μm diameter) on top of the deposition target, only 17 min of deposition was needed to get twice as much coverage for this 0.23 mm$^2$ spot in less than 17 min, even though the total depositing current dropped to 8 nA. Improved color uniformity was also achieved by this spot compared to panel A. FIG. 24 panel C is an image showing that an array of even smaller spots was created by using arrayed mask. FIG. 24 panel D is an image showing 100 μm spots separate by <2 mm.

FIG. 29 panel B is an image showing the reconstructed contour plot of the ion intensity at the deposition surface as measured by the scan of the ionCCD. The elongation along the x-axis of the figure is due to distortion of the IonCCD. FIG. 29 panel C is an image showing a spot created by depositing silver ion for 12 hours with an average coverage of 100 ML. FIG. 29 panel D is an image showing on the edge of the spot from FIG. 14 panel C, where the actual coverage varied due to the current density drop, a rainbow-like color transition was observed. This means that the surface plasmon resonance of this modified surface area can be tuned by just varying the coverage of depositing silver ions between 0 and 100 ML.

DETAILED DESCRIPTION

The invention generally provides systems and methods for the direct synthesis of metal containing products, such as a metallic nanoparticles and/or metal clusters, from noble metals (such as gold) or noble metal salts without using oxidizing and/or reducing reagents. In certain aspects, the invention generally relates to systems and methods for producing droplets including solvated metal ions. In other aspects, the invention generally relates to systems and methods for producing metal cluster ions at atmospheric pressure, thereby allowing neutral clusters to be generated. In other aspects, the invention generally relates to functionalized substrates, such as substrates functionalized for surface enhanced Raman Spectroscopy, methods of making thereof, and methods of patterning surfaces.

Systems and Methods for Producing Droplets Including Solvated Metal Ions

In certain embodiments, direct ionization of metals (including noble metals) under ambient conditions is achieved using electrospray with organic solvents. For example, gold is directly ionized to gold (I) cations in acetonitrile solution and the solvated metal cations are then carried to a target by spraying micro-sized charged droplets that can be directed by electric fields or by a gas stream. The target can be an analytical instrument or it can be a collection medium where the droplets are allowed to deposit and form a nanoparticle or to react for example in a catalytic reaction presumably via formation of a nanoparticle. The chemical environment of the deposition medium is independently manipulated and this allows for the transformation of metallic ions species (e.g. gold(I)) into other forms of the element. Those products (metallic, organometallic, etc.) can be collected and then used to perform further chemical manipulations, including various catalytic reactions.

A nanoparticles generally refers to a small object that behaves as a whole unit with respect to its transport and properties. Nanoparticles typically have at least one dimension between 1 and 100 nanometers, although particles that are smaller or larger, e.g., 200 nanometers, 500 nanometers, 1000 nanometer, or 2000 nanometers are also considered nanoparticles for purposes of the invention. Metallic nanoparticles are further described, for example in Mody et al. (J Pharm Bioallied Sci., 2(4): 282-289, 2010), the content of which is incorporated by reference herein in its entirety.

Figure 1:
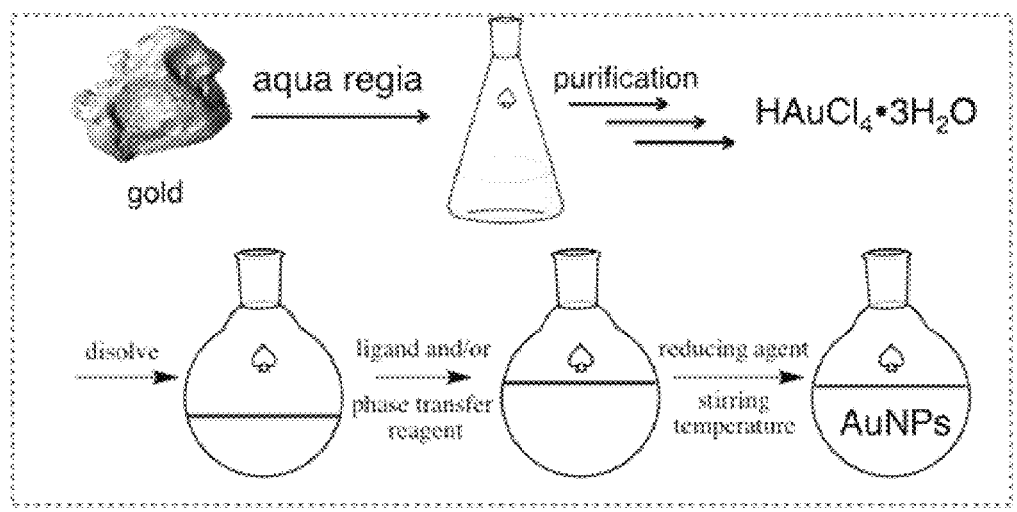
FIG. 1 is a drawing illustrating a prior art method for producing gold nanoparticles.

FIG. 1 illustrates a prior art method of producing metallic nanoparticles. The most common methods of generation of nanoparticles and metal clusters use chemical reduction of precursor compounds using reagents (such as $NaBH_4$) in bulk solution in the presence of capping ligands. This allows reduction to the metal, clustering to form nanoparticle assemblies of the desired size and protection of these assemblies. The precursor compounds are the corresponding metal salts (such as $HAuCl_4$) produced in separate steps involving oxidation of metals by acids and purification and isolation of the salts. (See FIG. 1).

In contrast to the prior art method described in FIG. 1, systems and methods of the invention allow for production of metallic nanoparticles directly from a starting metal. That process is illustrated in an exemplary manner in FIG. 2, in which gold is used as the exemplary starting metal. One of skill in the art will appreciate that the method described in FIG. 2 and throughout this application applies to any metal containing compound, such a noble metals or organometallic compounds, and is not limited to gold or indeed to metals.

Figure 2:
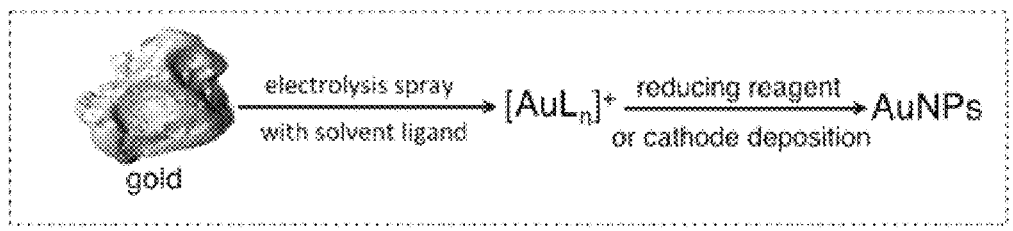
FIG. 2 is a drawing illustrating methods of the invention for producing gold nanoparticles.

In the method shown in FIG. 2, the gold is contacted with a solvent and voltage is applied to the gold and solvent producing an electrolysis spray. The spray is solvent droplets that include dissolved gold ions. Those droplets including the metal ions are directed to a reactive surface, where either a cathode or a reducing agent is used to reduce the charged ions to produce the gold nanoparticles. While FIG. 2 shows using either a cathode or a reducing agent, in some embodiments, both a cathode and a reducing agent are used. Directing ions to a surface and landing ions is described, for example in International patent application number PCT/US13/41348, and U.S. Pat. No. 7,361,311, the content of each of which is incorporated by reference herein in its entirety.

Figure 3:
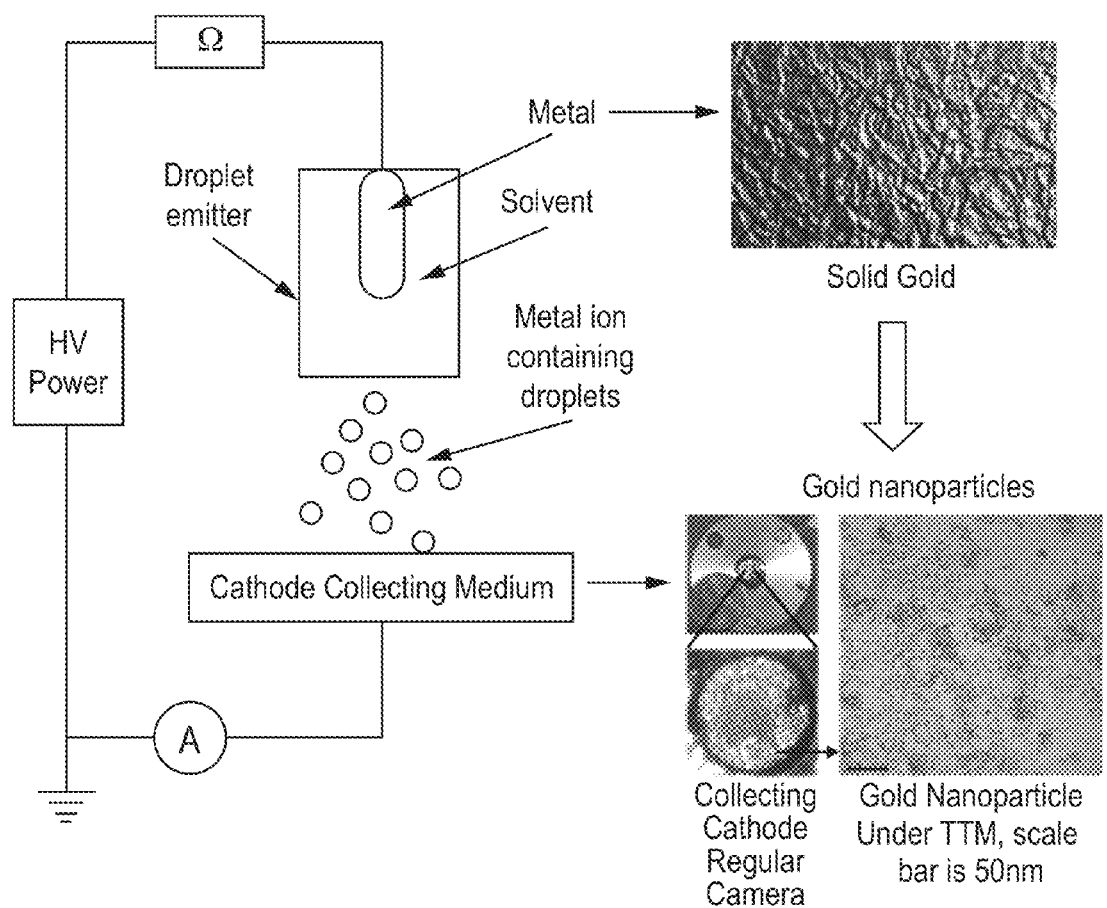
FIG. 3 is a drawing illustrating an embodiment of a system of the invention.

FIG. 3 illustrates an embodiment of a system of the invention. Systems of the invention include a droplet emitter. Such an emitter may be a standard electrospray probe, which is well known in the art. Such probes are described, for example in Fenn et al. (Science, 246(4926):64-71, 1989), Ho et al. (Clin Biochem Rev, 24(1): 3-12, 2003), and Rehman (U.S. patent application number U.S. 2012/0012453) the content of each of which is incorporated by reference herein in its entirety. The droplet emitter includes a metal anode coupled to a solvent vessel. The anode is configured such that a solvent in the vessel is able to interact with the metal anode. The metal anode of the droplet emitter is coupled to a voltage source. Application of voltage to the metal in the solvent causes droplets of solvent including metal ions to be produced and emitted from the emitter. The solvent droplets including the metal ions are then directed to a reactive surface.

The invention encompasses numerous types of reactive surfaces. For example the reactive surface may be a surface that includes a cathode, with or without a cathode solvent, as shown in FIG. 3. In such embodiments, interaction of the metal ions in the solvent droplets with the cathode reduces the metal ions to a neutral state. In other embodiments, the reactive surface is a surface that includes a reducing reagent. Using systems of the invention, metallic nanoparticles of any type may be produced, such as gold nanoparticles (FIG. 4A) or silver nanoparticles (FIG. 4B).

Different combinations of solvent and voltage allow the generation of metallic ion species with different oxidation states individually or collectively, including those that are labile toward disproportionation when stored in bulk. The chemical environment of the deposition medium is independently manipulated and this allows for the transformation of metallic ions species. The different chemical environment of the target deposition medium allows, for example, synthesis of nanoparticles and clusters; synthesis of organometallic compounds including catalysts; and metal tagging by reaction with other neutral molecules. Table 1 below shows different combination of solvents, metals, and reactive surfaces for producing different types of metallic nanoparticles. Each column is independent of each other and multiple combinations may be used.

The quantity of precursor generated and delivered to the target spot, is controlled by an electrical system, as opposed to weight/volume-based measuring systems used in current solution phase methods. That allows for the synthesis of the final products in amounts ranging from infinitesimal to bulk quantities. These features, combined with the advantages discussed above, allow single-layer synthesis of metallic nanoparticles and other products on surfaces in an easily controllable way. The controllable small amount of evenly distributed ion deposition also allows for easier synthesis of nano alloys. The spray can be used to catalyze reactions e.g. polymerization in a solution.

Systems and methods of the invention allow for production of metallic nanoparticles in high yield with little waste. The whole process may be thought of as essentially a one-pot reaction with high atomic efficiency. Contact with conventional glassware is also eliminated removing a source of waste inevitable in conventional mass transfer processes. The metal ions/clusters are generated as and when needed. The metal ion sources can be easily and cheaply preserved and transported.

When used in surface patterning, this method has important advantages in that it eliminates the bulk chemical reaction handling processes. The metal ions and other reagents are contained in charged droplets guided by electric fields or gas streams toward the target surface.

Systems and methods of the invention lower the cost and time in the production of derived products. The patterning of a single surface (3 cm$^2$ using a single sprayer) with nanoparticles can be accomplished in as little as five minutes.

Droplet-transport of metal ions allows a wide range of chemical reactions to be used. Because the solvents are unreactive, weaker ligands can be used compared to the counter ions of corresponding metal salts used in all current methodologies.

When used in catalysis, the nanoparticles can be prepared offline or they can be prepared in situ by directly spraying the metal ion containing droplets into the target.

TABLE 1

| Anode solvents | Metal | Cathode solvents | Capping ligands | Reducing reagent |
|---|---|---|---|---|
| Pyridine | Gold | None | None | Cathodic electron |
| Ammonia | Silver | Water | Sodium citrate | NaBH$_4$ |
| Dimethyl sulfoxide | Copper | Toluene | Tetraoctylammonium bromide | Metal ion itself (disappropriation) |
| Acetonitrile | Platinum | Ethanol | Cetyl trimethylammonium bromide | |
| Dimethylformamide | Palladium Ruthenium | Heptane | Dodecanthiol Chitosan | Dithiothreitol Ethyl aldehyde |

Systems and methods of the invention eliminate the use of strong oxidizing acids in producing metal precursor reagents from the metal, and eliminate the use of reducing agents in certain syntheses of nanoparticles.

Without being limited by any particular theory or mechanism of action, it is believed that the metallic elements are introduced into the solution in the form of weakly chelated cations (without counter ions or with a deficiency of counter ions), as opposed to using metal salts in conventional methods. The polar nature of droplets containing the metal ions allows a wider range of chemistry at the landing site including easier reduction of the metal.

When preparing larger quantities of metal containing products, landing the metal cation containing droplets to a target liquid medium is self-stirring. The mixing is achieved by numerous micro-droplets deposition events and a self-stirring phenomena, as opposed to the mechanical stirring in the conventional methods. When droplet lands on the liquid cathode surface, it merges but does not mix immediately. The self-stirring phenomena is the result of the momentum from the impinging droplets. Initial kinetic energy of the droplet (from the pneumatic force of the sprayer) pushes the droplet moving forward for some distance.

Systems and Methods for Producing Metal Cluster Ions

In certain embodiments, the invention generally provides systems and methods for producing metal cluster ions at atmospheric pressure. A cluster is an ensemble of bound atoms intermediate in size between a molecule and a bulk solid. A metal cluster contains a group of two or more metal atoms where direct and substantial metal-metal bonding is present. Typically, a cluster includes aggregates of 5 to $10^5$ atomic or molecular units, but metal clusters of the invention are not limited to this aggregate range and clusters of the invention may include a greater or lesser number of molecular units with very small clusters being very easy to create. Metal clusters may be homometallic, in which the same metals are bound to each other. Alternatively, metal clusters may be heterometallic, in which different metals are bound to each other. Metal clusters of the invention may be noble metal clusters or other types of metal clusters, such as organometallic clusters, metal halide clusters, transition metal clusters, etc. Metal clusters of the invention may be naked (also known as unprotected) or protected, such as by a capping ligand. Metal clusters are further described, for example in Schmid et al. (Phil. Trans. R. Soc. A, 368(1915): 1207-1210, 2010), the content of which is incorporated by reference herein in its entirety.

Figure 11:
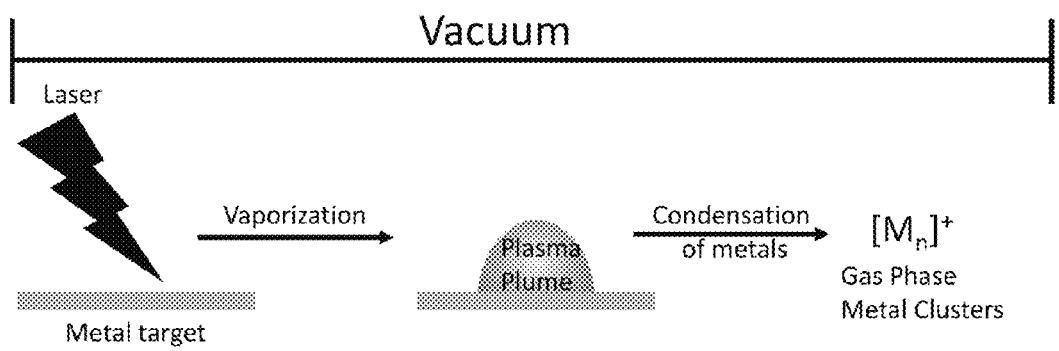
FIG. 11 is a schematic showing a prior art method of producing metal cluster ions.
Figure 12:
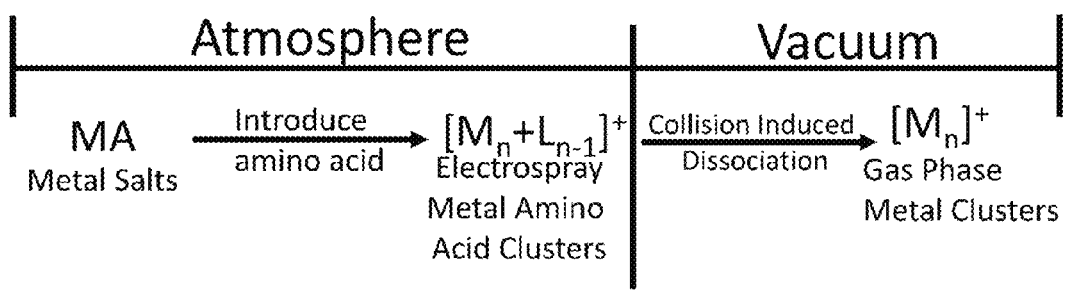
FIG. 12 is a schematic showing another prior art method of producing metal cluster ions.

Generally, naked or unprotected noble metal clusters are traditionally produced in vacuum using laser ablation. FIGS. 11-12 show prior art methods of producing metal ion clusters. FIG. 11 shows a prior art laser vaporization method. That method is performed entirely under vacuum. In that method, a laser is directed to impinge on a metal target, to thereby vaporize the metal into metal clusters in a plasma plume. The metal clusters in the plume are condensed under vacuum to produce gas phase metal cluster ions that are under vacuum. The methods involve pulsed-laser vaporization, continuous-operating ovens, fast atom bombardments, secondary ion sputtering, and arc discharge sources. FIG. 12 shows a prior art ligand stripping method. In that method, preformed ligated metal clusters are ionized and then transformed into naked metal clusters by ligand stripping in vacuum through collision induced dissociation.

Figure 13:
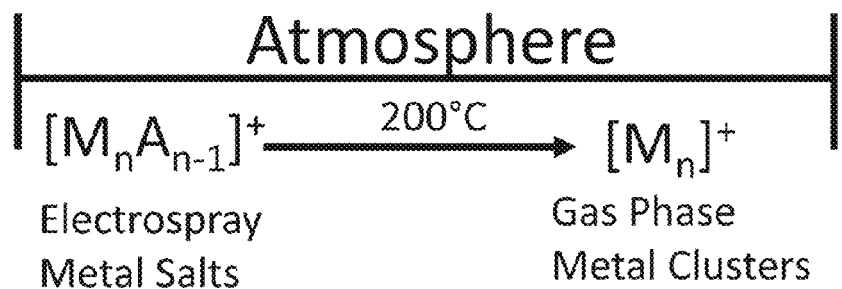
FIG. 13 is a schematic showing methods of the invention for producing metal cluster ions.

Unlike prior art methods, the embodiments described herein generally provide systems and methods for producing metal cluster ions at atmospheric pressure. Systems and methods of the invention combine electrospray ionization of appropriately chosen metal salts with modest heat to achieve similar results, at atmospheric pressure (FIG. 13). For example, using silver salts (e.g. silver acetate) the experimental conditions can be adjusted to produce predominantly $Ag_3^+$ or $Ag_5^+$ ions in the spray. The trimeric silver clusters interact in ambient air with vapors of alcohols and other reagents to give adducts such as $[Ag_3^+M_2]$. The metal clusters can be deposited on surfaces in air or in vacuum and used as reagents in heterogeneous reactions.

Systems of the invention include a droplet emitter. Such an emitter may be a standard electrospray probe, which is well known in the art. Such probes are described, for example in Fenn et al. (Science, 246(4926):64-71, 1989), Ho et al. (Clin Biochem Rev, 24(1): 3-12, 2003), and Rehman (U.S. patent application number U.S. 2012/0012453) the content of each of which is incorporated by reference herein in its entirety. The droplet emitter is operably coupled to a heat source. The heat source may be a chamber that heats a gas (e.g., air or nitrogen or other gas) surrounding the probe such that sprayed metal salts are heated to approximately 200° C. The heat source may also be a heat gun, or other directed heating source that can direct a flow of heated gas onto the metal salt. In certain embodiments, the heat source is a heated coil loop through which the metal salt passes. The metal salt is generally in contact with a solvent. In certain embodiments, the metal salt reacts with the solvent. In other embodiments, the metal salt does not react with the solvent. Application of voltage and heat to the metal salt produces metal cluster ions, as is shown in FIG. 13. The metal cluster ions are then directed to a target. Directing ions to a surface and landing ions is described, for example in International patent application number PCT/US13/41348, and U.S. Pat. No. 7,361,311, the content of each of which is incorporated by reference herein in its entirety.

In certain embodiments, the target is a surface, such as a reactive surface. The invention encompasses numerous types of reactive surfaces. For example the reactive surface may be a surface that includes a cathode, with or without a cathode solvent. In such embodiments, interaction of the metal cluster ions with the cathode reduces the metal cluster ions to a neutral state. In other embodiments, the reactive surface is a surface that includes a reducing reagent. Using systems of the invention, metal clusters of any type may be produced.

Different combinations of solvent and voltage allow the generation of metal cluster ion species with different oxidation states individually or collectively, including those that are labile toward disproportionation when stored in bulk. The chemical environment of the deposition medium is independently manipulated and this allows for the transformation of metal cluster ion species. The different chemical environment of the target deposition medium allows, for example, synthesis of clusters; synthesis of organometallic clusters including catalysts; and metal tagging by reaction with other neutral molecules.

Accordingly, the invention provides direct synthesis of small charged metal clusters and ligated metal clusters from metal salts without the use of chemical reducing agents. Systems and methods of the invention offer an alternative to laser and plasma based methods of generating metal and other molecular clusters. The systems and methods of the invention allow for the generation of charged metal clusters at atmospheric pressure under mild conditions. The charged metal clusters may be directly deposited into liquids and onto surfaces at atmospheric pressure to cause chemical reactions or to prepare surfaces, including catalytically active surfaces.

Systems and methods of the invention eliminate the need for chemical reducing agents to produce metal clusters, and the need for capping ligands to stabilize the metal clusters. Systems and methods of the invention eliminate the need for lasers and vacuum chambers for the production of ligated and unligated charged metal clusters. Rather, clusters are formed at atmospheric pressure under mild heating conditions and can be ligated by ion/molecule or solution phase reactions. The bare metal clusters are building blocks, which allow ligands, especially weaker one, to be attached.

Systems and methods of the invention provide a continuous atmospheric pressure metal cluster ion source at a low cost. The source can be handled and transported with ease. The source can be controlled to allow a specific amount of deposition onto a surface or into a liquid similar to the vacuum based experiments. Surface patterning of metal clusters can be done at atmospheric pressure in addition to the traditional method of in vacuum. Prepared surfaces can be catalytically active.

Reactions in ambient environment or vacuum can exploit the unique chemical properties of small molecular clusters. This allows in-situ generation of catalysts in a reactor.

Functionalized Substrates

In other embodiments, the invention provides substrates for surface enhanced Raman Spectroscopy and methods of making thereof. In certain embodiments, the invention provides a substrate for surface enhanced Raman Spectroscopy that includes a substrate and at least one discrete spot on the substrate that is modified for surface enhanced Raman Spectroscopy. The spot includes an aggregate of uncapped metal nanoparticles, in which each nanoparticle of the aggregate maintains its individual features. Other embodiments provide a functionalized substrate including a substrate, and a plurality of discrete structured features on the substrate, each structured feature including an aggregate of uncapped metal nanoparticles, in which each nanoparticle of the aggregate maintains its individual features.

The substrate may include a plurality of discrete spots. Typically, although not required, the spots are patterned onto the substrate. The substrate may additionally include a sample. The sample may be below the aggregate of uncapped metal nanoparticle. Alternatively, the sample may be above the aggregate of uncapped metal nanoparticle. The substrate may be composed of a variety of different types of materials. In an exemplary embodiment, the substrate includes a metal. The uncapped metal nanoparticles may include any type of metal, such as a novel metal. In certain embodiments, the metal is silver. In certain embodiments, the uncapped metal nanoparticles are uniform in size. Typically, the aggregates will be non-spherically shaped.

Other embodiments provide methods for producing a functionalized substrate. Such methods involve providing a substrate, and spraying, under ambient conditions, metal ions from a droplet emitter onto a discrete location on the substrate, thereby producing an aggregate of metal nanoparticles at the discrete location on the substrate. The methods may additionally involve moving to at least one other discrete location on the substrate, and spraying, under ambient conditions, metal ions from a droplet emitter onto the other discrete location on the substrate, thereby producing an aggregate of uncapped metal nanoparticles at the other discrete location on the substrate. The method may be repeated a plurality of times to produce an array of discrete spots. Methods of the invention may additionally involve depositing a sample on the substrate. The sample may be deposited prior to the spraying step. Alternatively, the sample may be deposited after the spraying step.

Other embodiments provide methods for producing a functionalized substrate that involve providing a substrate and a focusing mask, and spraying, under ambient conditions, metal ions from a droplet emitter toward the focusing mask such that the ions interact with the mask and are focused to a discrete location on the substrate, thereby producing an aggregate of metal nanoparticles at the discrete location on the substrate. In certain embodiments, the mask is a conductive mask. In other embodiments, the mask is a non-conductive mask. In certain embodiments, the mask may selectively block a portion of the metal ions. For example, the mask may selectively block positive metal ions. Alternatively, the mask may selectively block negative metal ions. In certain embodiments, moving the mask generates another aggregate of metal nanoparticles at another discrete location on the substrate. Methods of the invention may additionally involve depositing a sample on the substrate. The sample may be deposited prior to the spraying step. Alternatively, the sample may be deposited after the spraying step.

Figure 16:
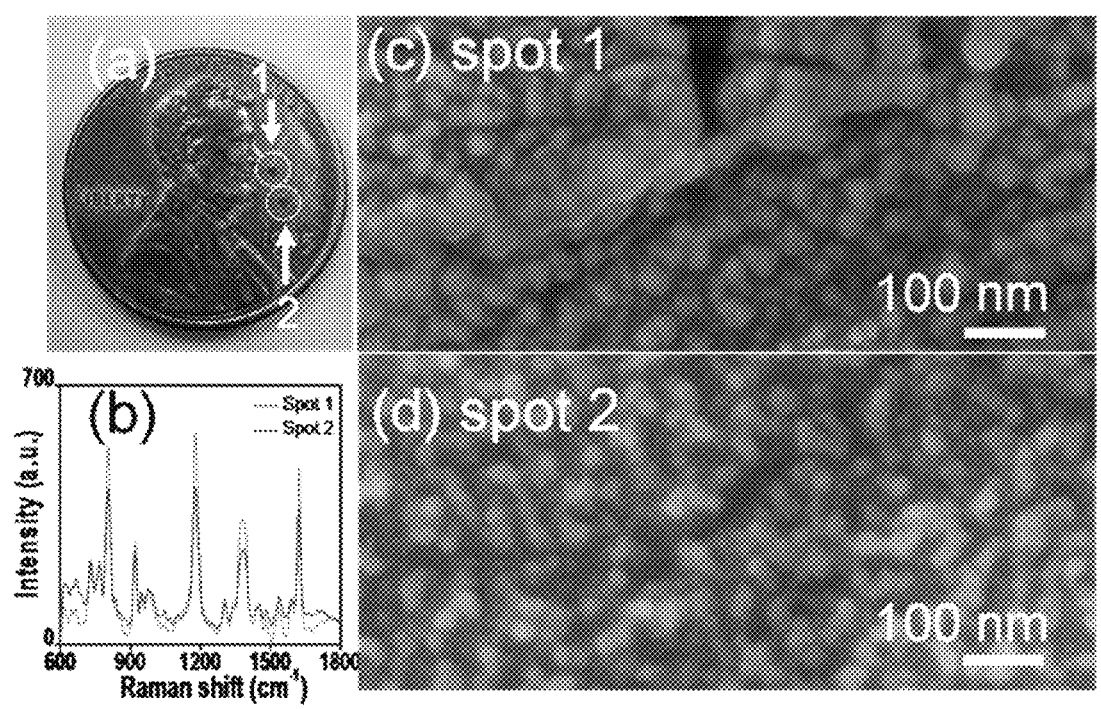
FIG. 16 panel A shows two AgNP containing spots were created on top of a penny coin by metal electrolytic spray ionization deposition under ambient conditions. The above spot was created before drop casting sample while the lower spot was created on top of a layer of sample (crystal violet). 10 ML of silver ions were landed to create the two spots. Similar morphology (FIG. 16 panels C and D) and enhanced Raman signal (FIG. 16 panel B) were obtained from the two spots.
Figure 19:
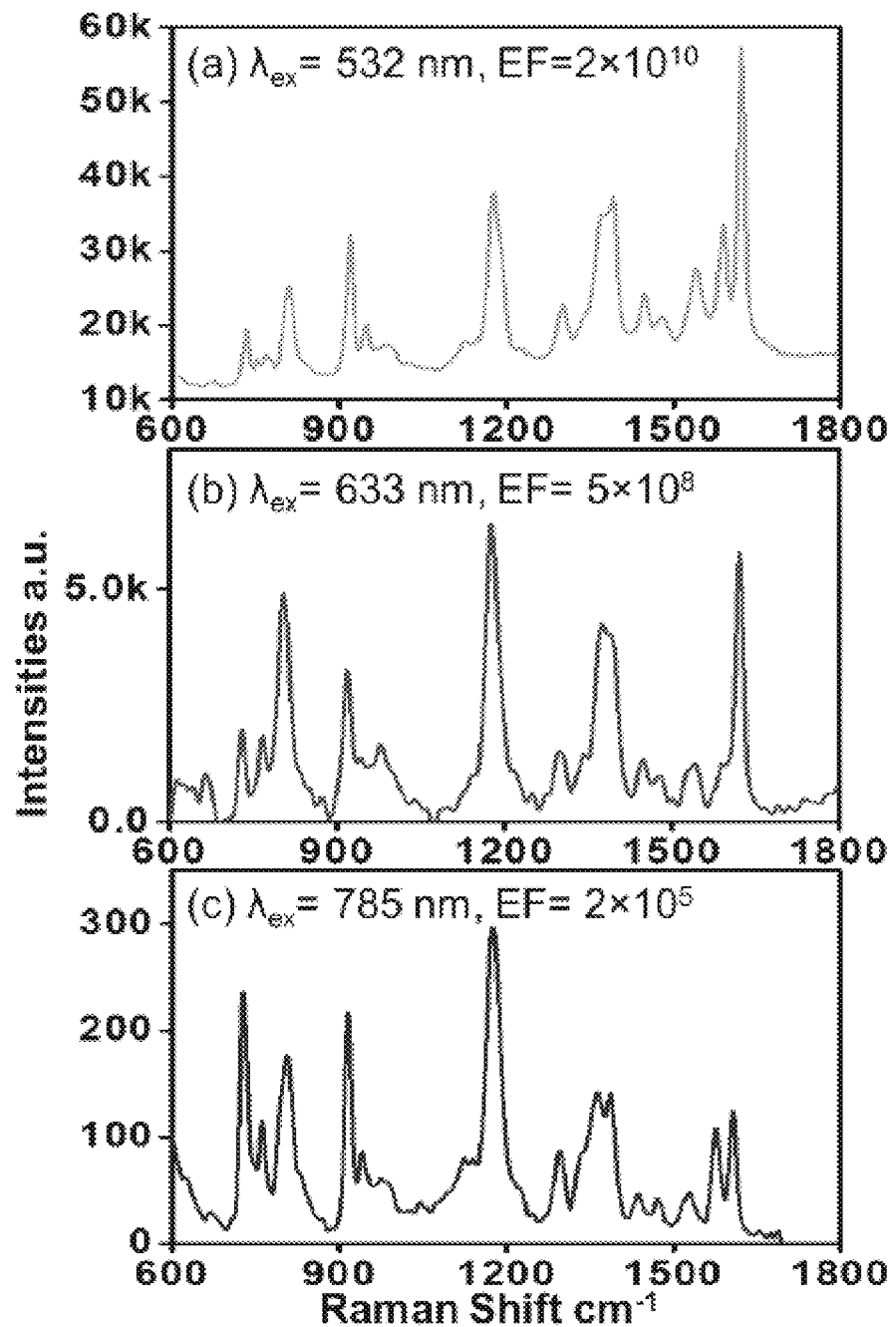
FIG. 19 panels A-C is a set of SERS spectra and average enhancement factor of crystal violet (10$^5$ per μm$^2$) on top of AgNP nanostructure on top of copper foil under excitation of (FIG. 19 panel A) 532 nm, 20 mW (FIG. 19 panel B) 633 nm, 8.6 mW (FIG. 19 panel C) 785 nm lasers, 52 mW.

Silver is a widely used SERS material (Asiala et al., Analyst 2011, 136, 4472-4479) and the plasmon resonance of silver nanostructures are known to be tunable throughout the visible to mid-infrared regions of the electromagnetic spectrum (Jensen et al., J Phys Chem B 2000, 104, 10549-10556). Metal electrolytic spray ionization (described in greater detail in U.S. patent application Ser. Nos. 61/877,528 and 61/880,219, the content of each of which is incorporated by reference herein its entirety) spots on top of desired locations, both on top of previously deposited analyte and prior to analyte deposition. (FIG. 16, panel A). Both the NP-on-top and the NP-below configurations showed uniformly distributed silver NP's in SEM images. (FIG. 16, panel B). The sizes and shapes of the particles were polydispersed, yet the polydispersed morphology was uniform across each spot. (FIG. 19 panels A-C). On the one hand, the polydispersity gave the surface a wide range of surface plasmon resonance, making the spot SERS active when using lasers of different wavelengths [532, 633 and 785 nm, FIG. 20 using crystal violet and Rhodamine 6G FIG. 21 as probing molecules]. On the other hand, the uniform distribution created numerous evenly distributed hot spots. The robustness of this SERS surface is greatly enhanced by these features. Both the NP-on-top and the NP-below surfaces showed similar SERS enhancements, FIG. 16 panel B.

Figure 22:
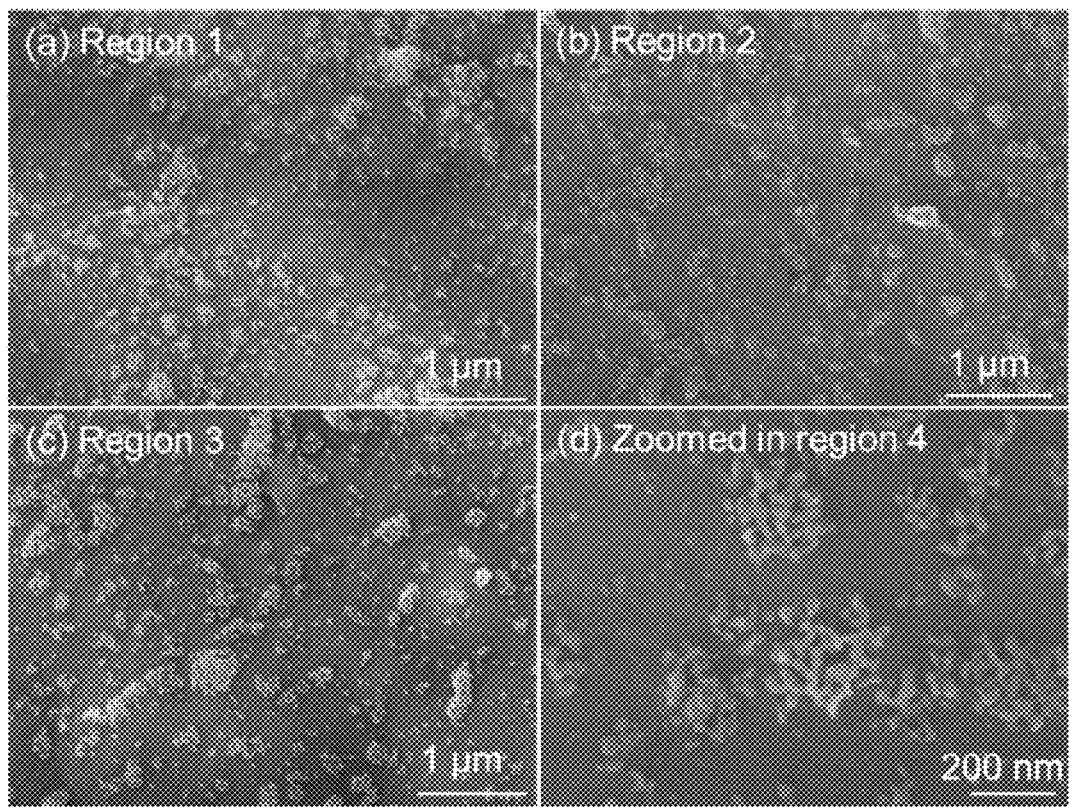
FIG. 22 panels A-D show AgNP structures created by 10 monolayer coverage of Ag$^+$ deposited on top of Aluminum foil. Polydispersed morphology was uniform throughout each spot created. Panels A-D are images from four randomly selected regions located >200 μm from each other in the same deposition spot.

A single metal electrode spray ionization emitter generates typical ion current of at least 10 nA. Silver($Ag^+$) containing ions dominates as can be observed by an atmospheric pressure interface to a mass spectrometer (Li et al., Angew. Chem., Int. Ed. 2014, 53, 3147-3150). The diameter of the emitter tip was typically 1-5 μm. The spray plume started with this ~μm scale diameter and after travelling toward landing surface in ambient air along the electrical gradient for ~5 mm, the plume diameter had expanded to 3-5 mm. Mapped by an Ion CCD (Hadjar et al., J. Am. Soc. Mass Spectrom. 2011, 22, 612-623), the charge distribution of the plume maximized at its center and dropped towards the edges, very slowly in the beginning and then more rapidly (FIG. 22). This "pseudo uniformity" in the central region was evident when examining the prepared structures by optical and electron microscopy. The coverage of the deposited silver ions can be controlled by regulating the deposition time and estimating the deposition current and spot size. Better coverage values were calculated from the accurately measured spot sizes and the logged deposition currents (Li et al., Angew. Chem., Int. Ed. 2014, 53, 3147-3150). The deposited metal ions created circles of nanoparticles which were used in SERS analysis by Raman microscopes.

Figure 17:
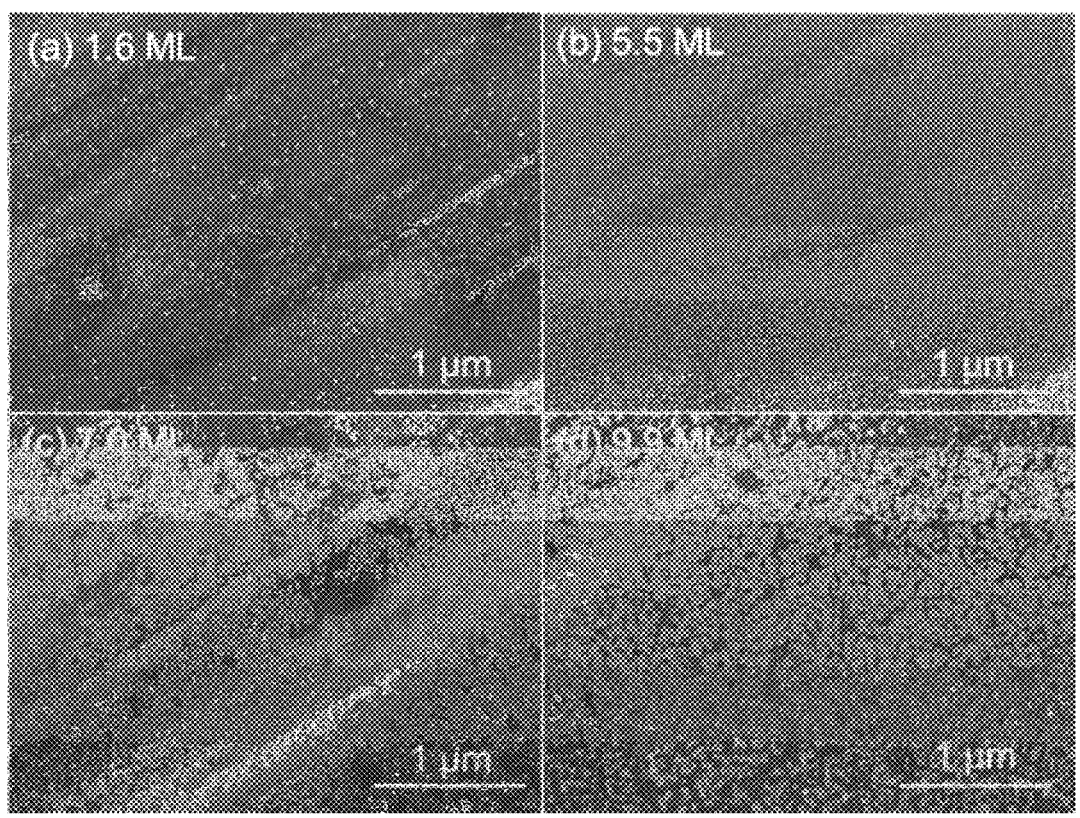
FIG. 17 panels A-D show morphologies of surface nanostructures created by depositing different amount of silver ions onto a copper foil using metal electrolytic spray ionization deposition. Coverage turned out to be one determining factor for the SERS performance of spots created by this surface modification method.
Figure 18:
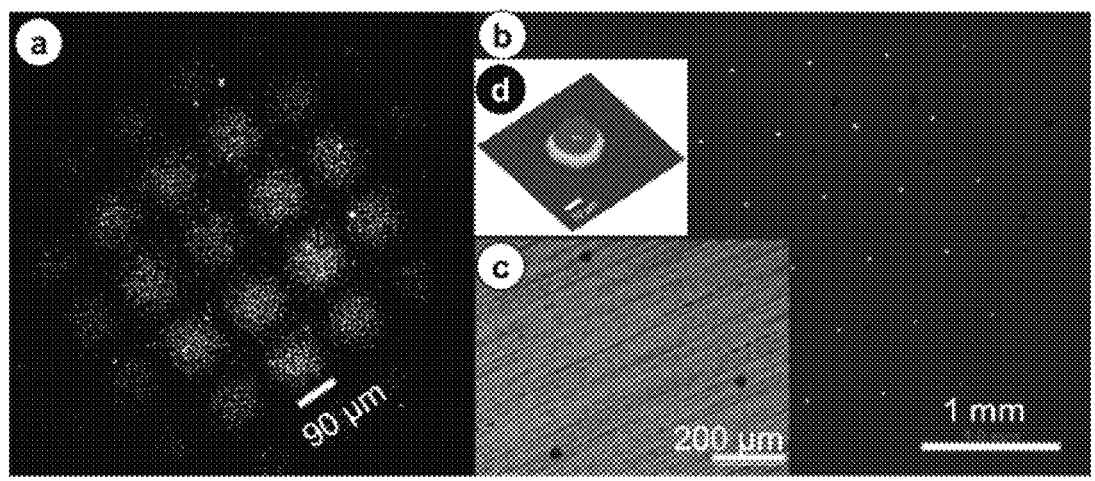
FIG. 18 panel A is a dark field image of AgNP patterns created using a grounded TEM grid as mask, 90 μm squares separated by 10 μm columns.
Figure 23:
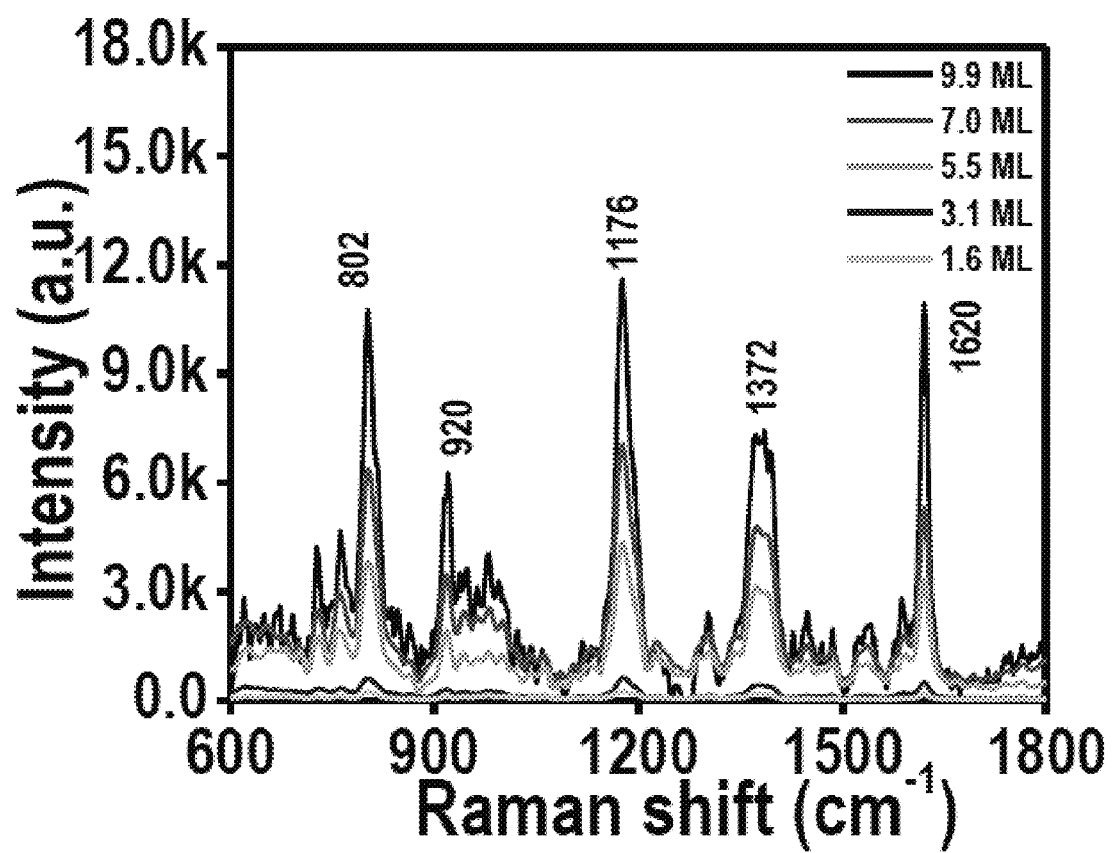
FIG. 23 shows different SERS signal intensity from surfaces modified with different Ag coverage on a copper foil.
Figure 24:
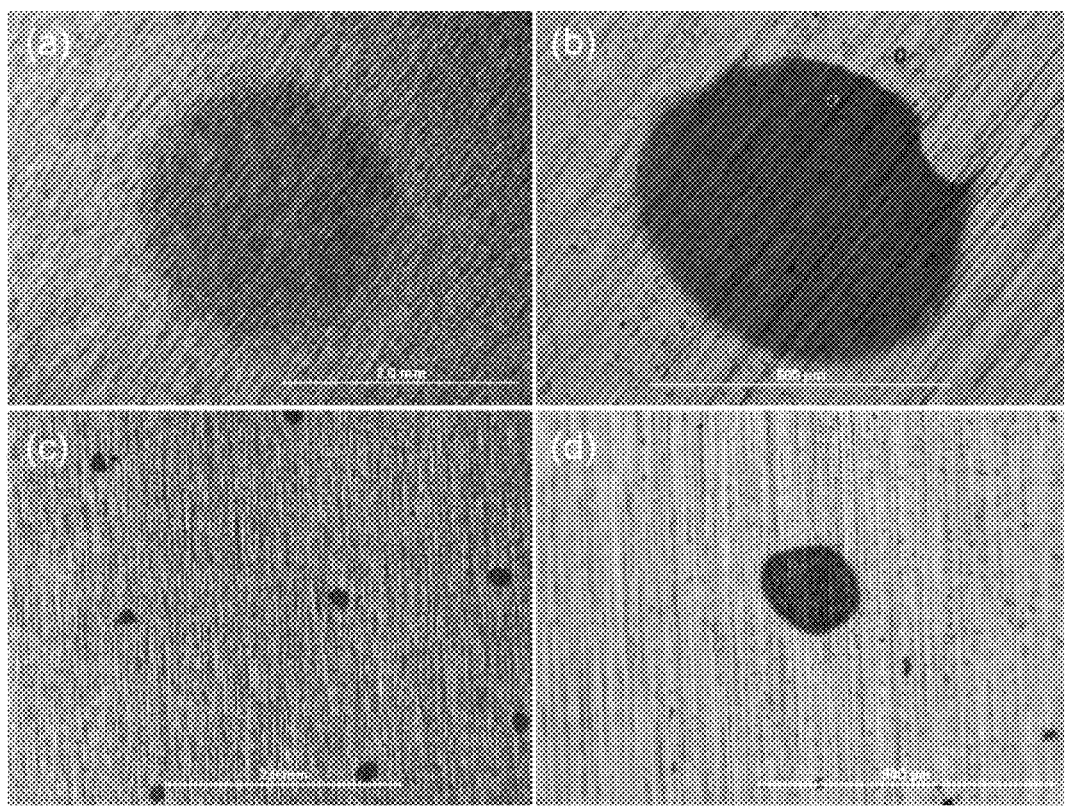
FIG. 24 panel A is a 4.9 mm$^2$ AgNP spot created on top of copper foil by direct deposition without using any focusing or masking. This spot of averaged 8 ML coverage of silver was created by 136 min deposition of 13 nA landing current.
Figure 25:
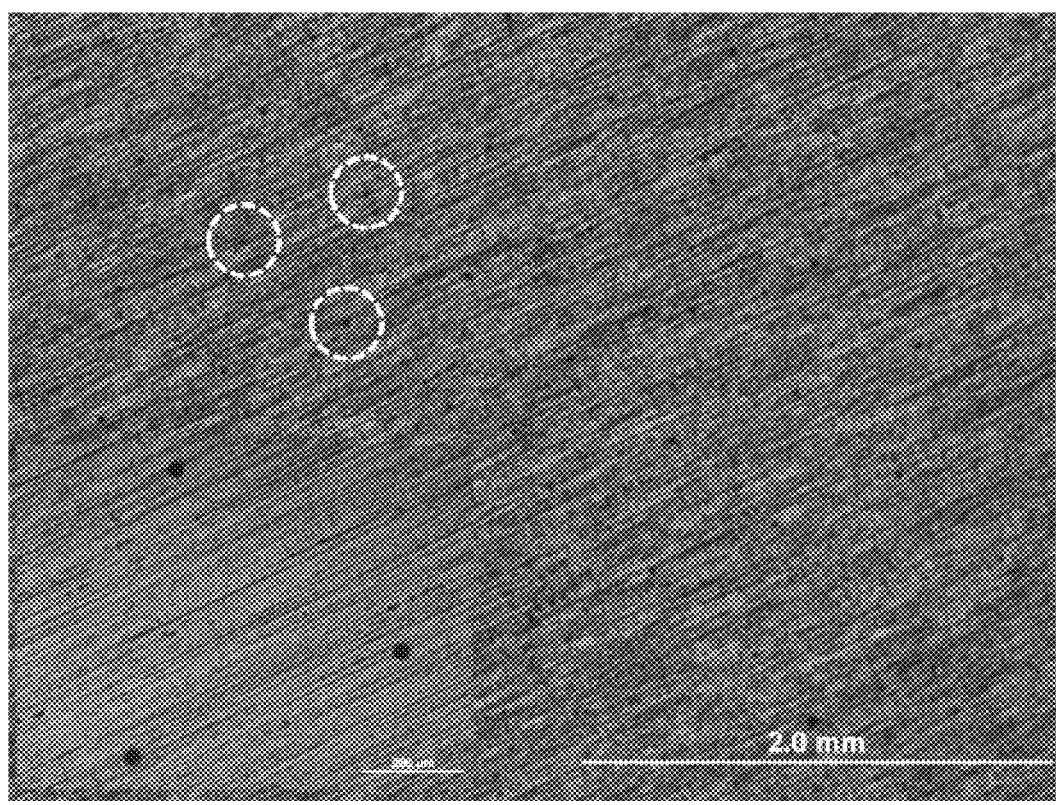
FIG. 25 is an image showing an array of (20 μm) AgNP spots deposited on top of a copper foil using a floated conductive stainless steel mesh as mask. The spots are 560 μm away from each other. The mask used is shown in the FIG. 26 and importantly it has much larger apertures than the spot sizes because of the focusing property of the electrically floated mesh.
Figure 26:
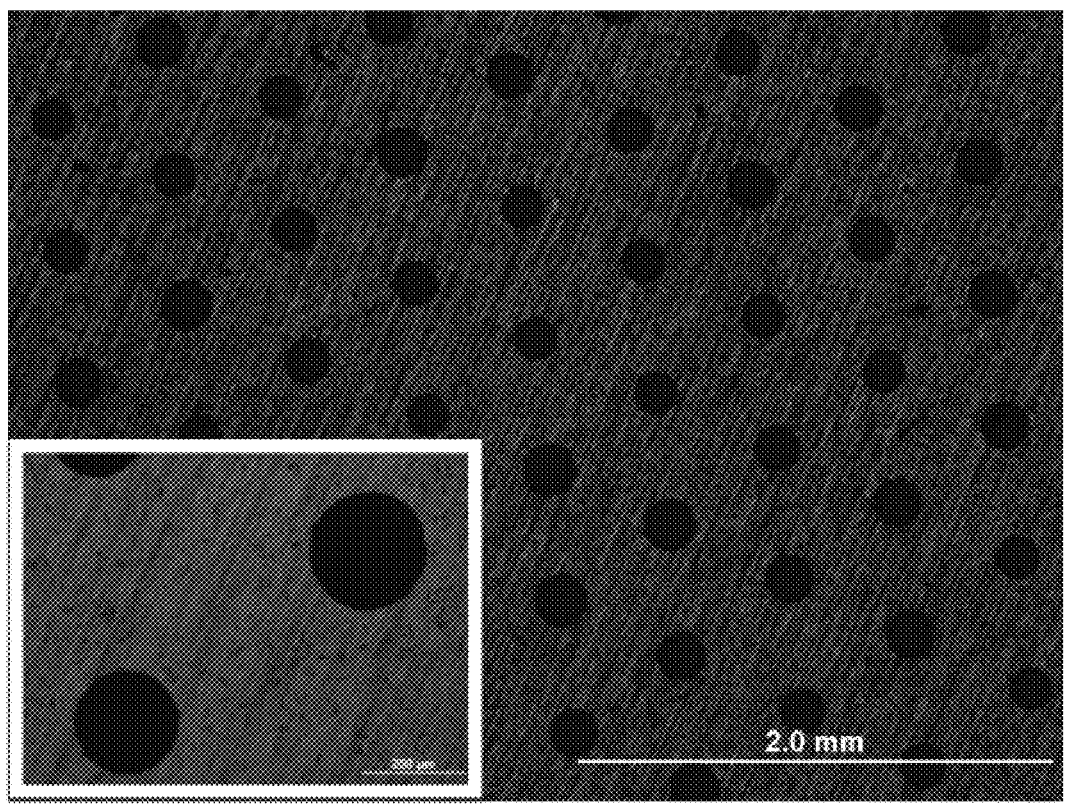
FIG. 26 is an image showing the stainless mesh used to create the pattern shown in FIG. 25. This mesh is a flat 200 μm thick plate composed of with ~200 μm holes. The floating/insulation from ground is achieved by 50 μm separation with the deposition target by plastic tape.

Using copper foil as the support material, a coverage dependent study was carried out to investigate its effect on SERS enhancement. As shown in FIG. 23, the Raman signal for crystal violet (1 μM in MeOH, 2 μL dropcast over the ~3 mm AgNP spot) increased more than 10 times when the silver coverage increased from 1.6 ML to 5.5 ML and continued to increase until the CCD detector was saturated at 9.9 ML. SEM images of these surfaces are shown in FIG. 17.

When the surface coverage was low (1-3 ML), only single nano particles and small numbers of aggregates were observed. As the silver coverage increased through further deposition, the granules/particles started to grow larger. At 5.5 ML coalescence and aggregation of neighboring particles was observed. As more silver was deposited (7.0 ML), aggregation gradually became universal making it difficult to identify individual particles. This coverage controlled and surface anchored in situ nanostructure fabrication produced uncapped nanoparticles with far better uniformity than those typical of solution-phase experiments ((Li et al., Angew. Chem., Int. Ed. 2014, 53, 3147-3150), in which size distribution can only be controlled by capping agents. An important phenomenon is that the individual NP features were maintained during this aggregation process creating numerous 1-5 nm gaps and crevices across the surface. This is likely due to the fact that the particles were anchored to the metal surfaces during their growth. These types of nano junctions and nano gaps are believed to be ideal for creating SERS hot spots (Asiala, Z. D. Schultz, Analyst 2011, 136, 4472-4479; and Fang, N. H. Seong, D. D. Dlott, Science 2008, 321, 388-392). When the coverage was further increased 9.9 ML, these aggregates grew even bigger while keeping their non-spherical shapes. The aggregated nature of the prepared NP structures was also evident from measurements by dark filled hyper-spectral imaging (HSI) in which the scattering spectra showed multiple colors of photons scattered from the aggregated nanoparticles generated on top of an ITO coated glass slide. The SERS peak intensity summarized in Tables 3 and 4 in the Examples and the enhancement factors were calculated using a previous reported method (Greeneltch et al., Anal. Chem. 2013, 85, 2297-2303; and Chakraborty et al., Journal of Physical Chemistry Letters 2013, 4, 2769-2773), and also described in the Examples below.

If it is assumed that all current measured is that of singly charged metal ions with a circular landing spot of 3 mm diameter, 10 nA current is equivalent to 0.03 ML/minute. It would take 5 hr to prepare a 10 ML spot of this size. A higher landing current density can be achieved by positioning the emitter closer to the surface or by increasing the spray voltage from 1.5 kV to say ~2.5 kV. However, these operations also increased the fluctuation of both landing current and spot size, making it difficult to estimate coverage accurately. By placing a mask made of non-conductive material (or electrically floated conductive material) placed on top of the deposition surface the landing current density could be increased reproducibly. The local electric field that enabled the increase in current density is believed to be generated through a self-charging mechanism by charge buildup on the non-conducting material during the ion deposition experiment.[1] The simplest form of this idea is realized by applying a perforated plastic foil on top of the deposition target. In typical experiments, this increased landing current density by a factor of ~9 even though a 5-25% decrease in total ion current was observed. This procedure also enabled a more uniform current distribution across the deposition region. Arrays of AgNP containing spots were created in a single deposition experiment, simply by using masks with an array of apertures (FIGS. 18 and 24-26).

Besides silver coverage, support materials were also found to have great influence on SERS activity of the deposited silver nanostructures, as is the case for other modification methods (Greeneltch et al., Anal. Chem. 2013, 85, 2297-2303; Asiala et al., Analyst 2011, 136, 4472-4479; and Murty et al., Langmuir 1998, 14, 5446-5456). Generally, the flat polished slide supports gave much lower SERS enhancement under the same conditions (10 ML Ag coverage, Table 2 in Examples below). Copper, aluminum and gold foils gave the highest averaged SERS enhancement factors exceeding 108 and reaching 1010. While brass, stainless steel and silver foils gave very weak enhancements. Although detailed mechanisms are not clear, gold foil support demonstrates that displacement plating (Lu et al., J. Am. Chem. Soc. 2007, 129, 1733-1742; and Liu et al., J. Am. Chem. Soc. 2013, 135, 11752-11755) (even if possible when depositing silver ions onto other metals with lower oxidizing potential) is not critical in the generation of SERS active surfaces by this method. The flexible foils used here serve as an efficient SERS sampling medium allowing drop casting, wiping, spin coating and spray deposition of samples. More importantly, samples can be present on the surface first and then hot spots can be generated in situ by depositing silver ions onto the sample spot (NP-on-top). Enhanced Raman signals were observed for all these methods. The SERS surfaces stayed active after ambient storage (1 Month) and after exposing to electron SEM analysis.

The metal electrolytic spray ionization deposition nanostructure fabrication method is a 'green', one-pot, ambient preparation method that eliminates vacuum, laser, and solution procedures associated with conventional nanofabrication. Micron scale patterns can easily be made for SERS imaging. For each SERS substrate, only sub nanogram amounts of silver are consumed. Operation under atmospheric pressure further reduces the cost and increases the ease of nanoscale surface modification. Metal electrolytic spray ionization deposition may serve well as a ready alternative to sputtering or vapor deposition in certain applications. Beyond SERS applications described in this report, metal electrolytic spray ionization deposition should find applications in related fields such as plasmonic superstructures and catalysis.

Collection of Ions without or after Mass-Selective Analysis

Systems and methods for collecting ions that have been analyzed by a mass spectrometer are shown in Cooks, (U.S. Pat. No. 7,361,311), the content of which is incorporated by reference herein in its entirety. In another embodiment, ions may be collected in the ambient environment (ambient pressure but still under vacuum) without mass analysis (See Examples herein). The collected ions may then be subsequently analyzed by any suitable technique, such as infrared spectrometry or mass spectrometry.

Generally, the preparation of microchips arrays of metal ions first involves the ionization of the metal. The metal ions can be produced by any of the methods discussed above. The ions can then be focused and collected using methods described below or can first be separated based on their mass/charge ratio or their mobility or both their mass/charge ratio and mobility. For example, the ions can be accumulated in an ion storage device such as a quadrupole ion trap (Paul trap, including the variants known as the cylindrical ion trap and the linear ion trap) or an ion cyclotron resonance (ICR) trap. Either within this device or using a separate mass analyzer (such as a quadrupole mass filter or magnetic sector or time of flight), the stored ions are separated based on mass/charge ratios. Additional separation might be based on mobility using ion drift devices or the two processes can be integrated. The separated ions are then deposited on a microchip or substrate at individual spots or locations in accordance with their mass/charge ratio or their mobility to form a microarray.

Whether or not mass-selection is used, the microchip or substrate is moved or scanned in the x-y directions and stopped at each spot location for a predetermined time to permit the deposit of a sufficient number of molecules to form a spot having a predetermined density. Alternatively, the gas phase ions can be directed electronically or magnetically to different spots on the surface of a stationary chip or substrate. The molecules are preferably deposited on the surface with preservation of their structure, that is, they are soft-landed.

In embodiments in which ions are collected without prior separation, the collection surface is operably coupled to receive the spray including the ions, as illustrated in FIG. 1. In embodiments that first use mass-selection, the surface is located behind the detector assembly of the mass spectrometer. In embodiments that use an ion focusing device, the surface for ion landing is located after the ion focusing device.

In embodiments that use mass-selection prior to ion landing, the high voltages on the conversion dynode and the multiplier are turned on and the ions are detected to allow the overall spectral qualities, signal-to-noise ratio and mass resolution over the full mass range to be examined. In the ion-landing mode, the voltages on the conversion dynode and the multiplier are turned off and the ions are allowed to pass through the hole in the detection assembly to reach the landing surface of the plate (such as a gold plate). The surface is grounded and the potential difference between the source and the surface is 0 volts.

An exemplary substrate for soft landing is a gold substrate (20 mm×50 mm, International Wafer Service). This substrate may consist of a Si wafer with 5 nm chromium adhesion layer and 200 nm of polycrystalline vapor deposited gold. Before it is used for ion landing, the substrate is cleaned with a mixture of $H_2SO_4$ and $H_2O_2$ in a ratio of 2:1, washed thoroughly with deionized water and absolute ethanol, and then dried at 150° C. A Teflon mask, 24 mm×71 mm with a hole of 8 mm diameter in the center, is used to cover the gold surface so that only a circular area with a diameter of 8 mm on the gold surface is exposed to the ion beam for ion soft-landing of each mass-selected ion beam. The Teflon mask is also cleaned with 1:1 MeOH:$H_2O$ (v/v) and dried at elevated temperature before use. The surface and the mask are fixed on a holder and the exposed surface area is aligned with the center of the ion optical axis.

Any period of time may be used for landing of the ions. In mass-selection embodiments, between each ion-landing, the instrument is vented, the Teflon mask is moved to expose a fresh surface area, and the surface holder is relocated to align the target area with the ion optical axis. After soft-landing, the Teflon mask is removed from the surface.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1

Catalytic Activity of Nanoparticles Generated by Metal Spray Deposition

Figure 6:
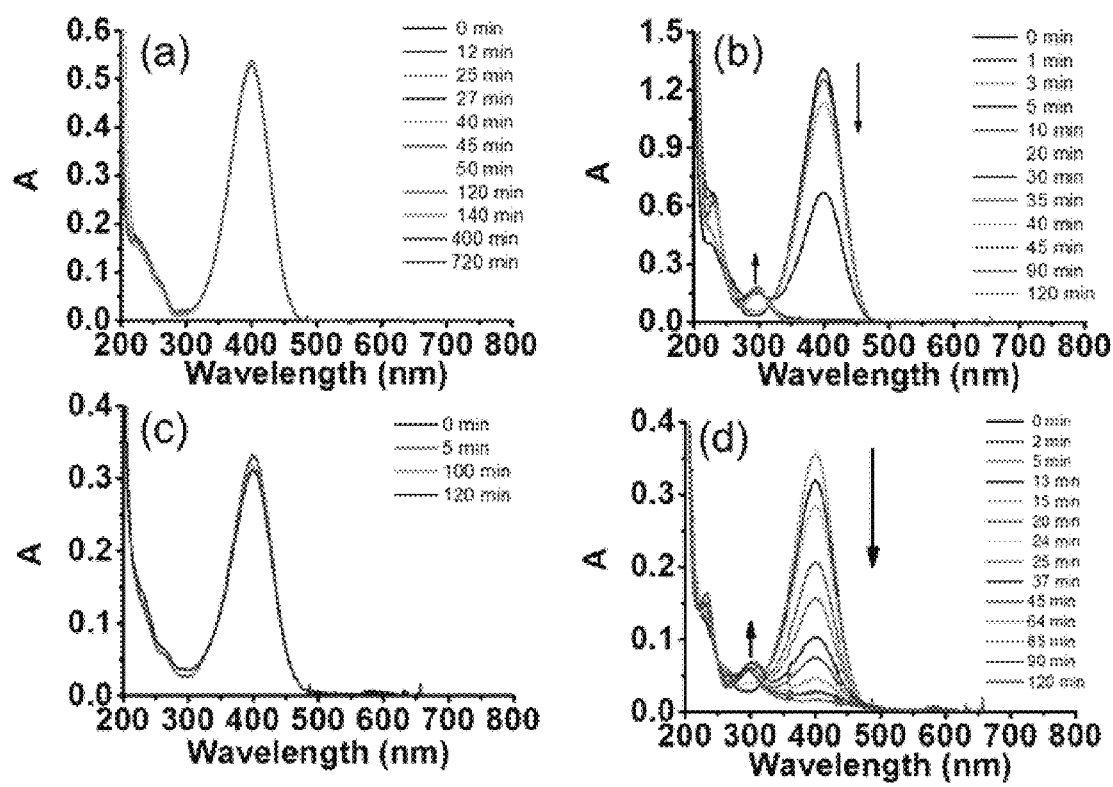
FIG. 6 panels A-D show that prepared (both offline and in-situ) nanoparticles can be used to catalyze chemical reactions.

A sample reaction was used to probe the catalytic reactivity of gold nanoparticles prepared as described above. UV-Vis absorption was used to monitor the reaction progression under different conditions (FIG. 5). An online in situ catalyst generation experiment was also carried out without the use of capping ligands, which are prerequisites in conventional solution-phase nanoparticle synthesis. Data analysis indicates that the catalytic activity (per Au atom) of the AuNP prepared this way is several orders of magnitude higher that those prepared offline (FIG. 6). The catalytic activity is surface-area related and this indicates the presence of even smaller (<100 atoms) particles in the in situ catalysis method by directly spraying $Au^+$ to the reaction liquid (FIG. 6).

Example 2

Preparation of Nanoparticle Alloy

Figure 7:
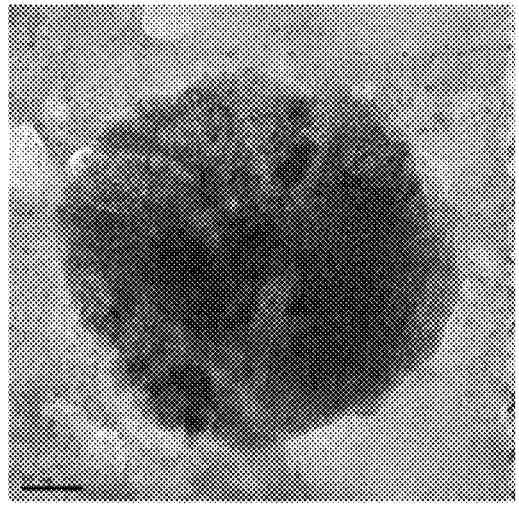
FIG. 7 is a transmission electron microscope (TEM) image of a nanoparticle composed of a silver core surrounded by and attached to smaller gold spheres.
Figure 8:
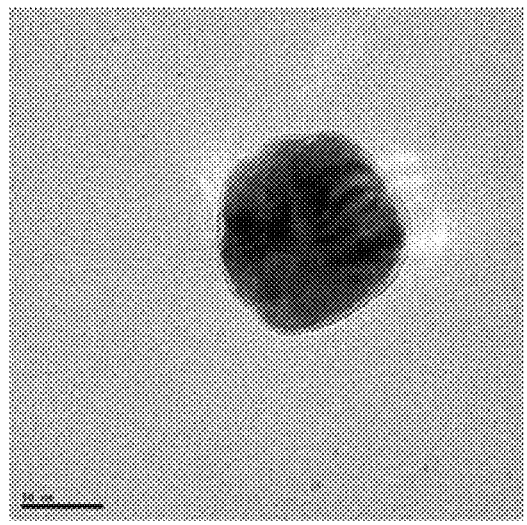
FIG. 8 is a TEM image of a nanoparticle composed of a gold core surrounded by silver sphere. Silver has lower electron density results in low color tone in the TEM figure.

The electrospray method was used to introduce different noble metals on a surface or into a solution in a controllable way. A "one-pot" nanoparticle alloy preparation was demonstrated as one application of this capability. Compared to multiple steps involved in bulk synthesis, simply switching the spraying nozzle is a much easier way of introducing different metal sources to the particle cores. FIG. 7 is a transmission electron microscope (TEM) image of a nanoparticle composed of a silver core surrounded by and attached to smaller gold spheres. FIG. 8 is a TEM image of a nanoparticle composed of a gold core surrounded by silver sphere. Silver has lower electron density results in low color tone in the TEM figure.

Example 3

Generating Catalysts for Other Reactions (ATRP Polymerization)

Figure 9:
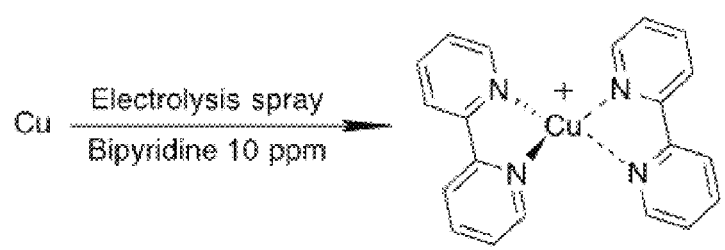
FIG. 9 is a schematic show direct generation of cuprous organometallic from its metal form, note the structure on the right is the catalyst for atom transfer radical polymerization.
Figure 10:
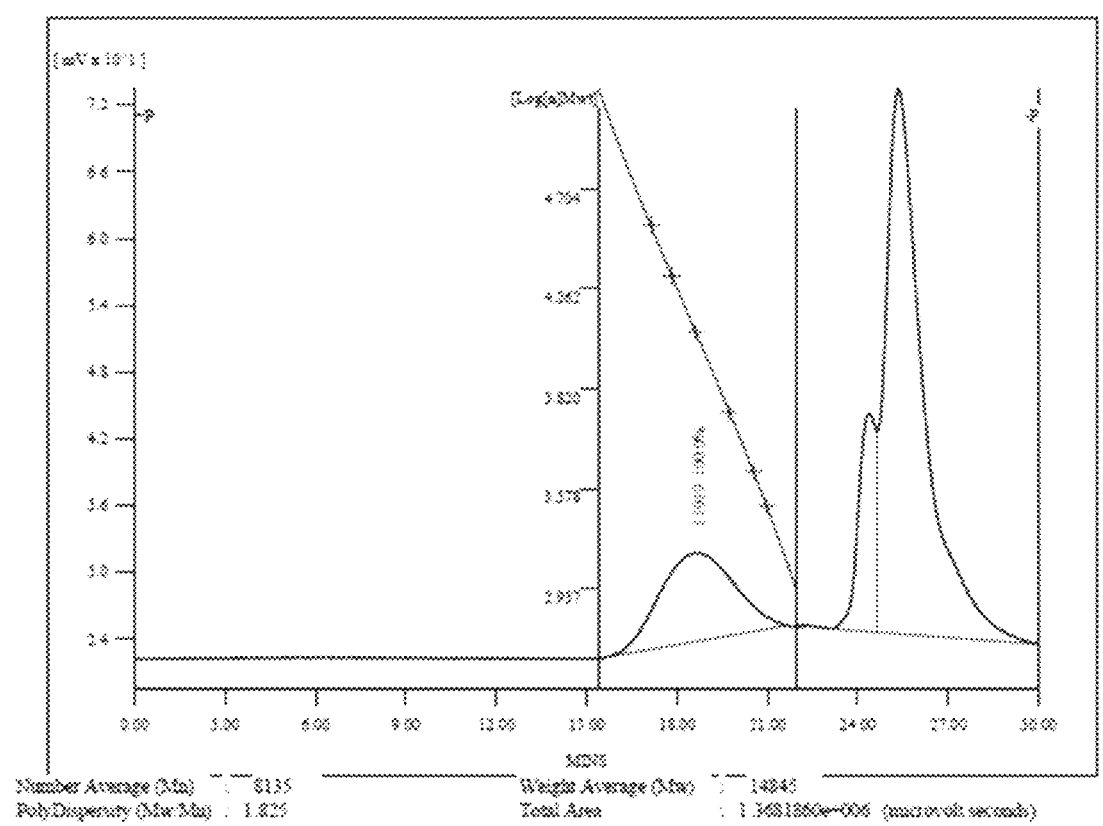
FIG. 10 is graph showing analytical results of synthesized polystyrene using gel permeation chromatography (GPC) and generated by nanoparticle catalyzed reaction. The average mass is 14 k Da.

The Cu(I)-ligand species (FIG. 9) are actually key structures for catalysis of Atom Transfer Radical Polymerization (ATRP). These species were collected similarly to the procedure used above in amounts (~1.5 mg) much less than those used in the literature. When used as a catalyst in the synthesis of polystyrene, polymers in the amount of gram were obtained (FIG. 10).

Example 4

Silver Metal Cluster Ions

Figure 14A:
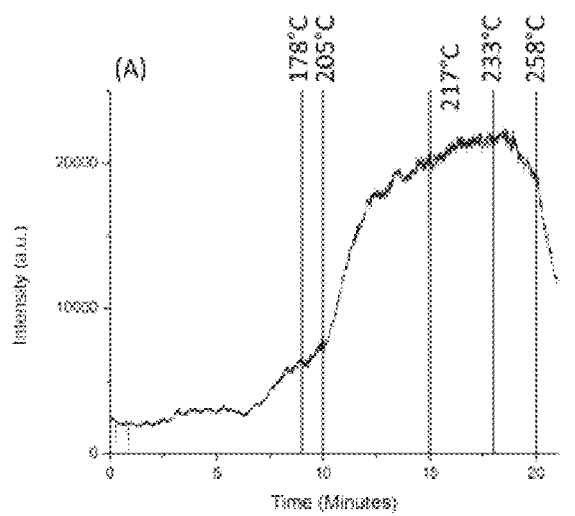
FIG. 14A is an ion chronogram of Ag$_3^+$ (appearing as a set of isotopic peaks in the region m/z 320-328) as a function of temperature.
Figure 14B:
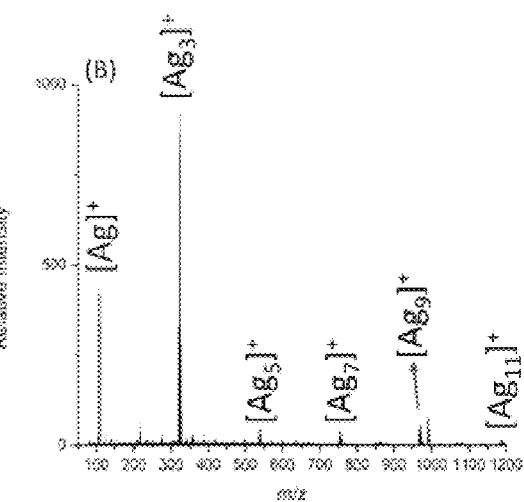
FIG. 14B is a representative mass spectrum of 1 mM silver acetate that has been passed through a heated coiled loop at 215° C. The [Ag$_3$]$^+$ represents 17% of the total ion current.

Systems of the invention were used to produce silver metal clusters. FIG. 14A is an ion chronogram of $Ag_3^+$ (m/z 320-328) as a function of temperature. FIG. 14B is a representative mass spectrum of 1 mM silver acetate that has been passed through a heated coiled loop at 215° C. The $[Ag_3]^+$ represents 17% of the total ion current.

Example 5

Silver Metal Cluster Ions in Alcohol Solvent

Figure 15:
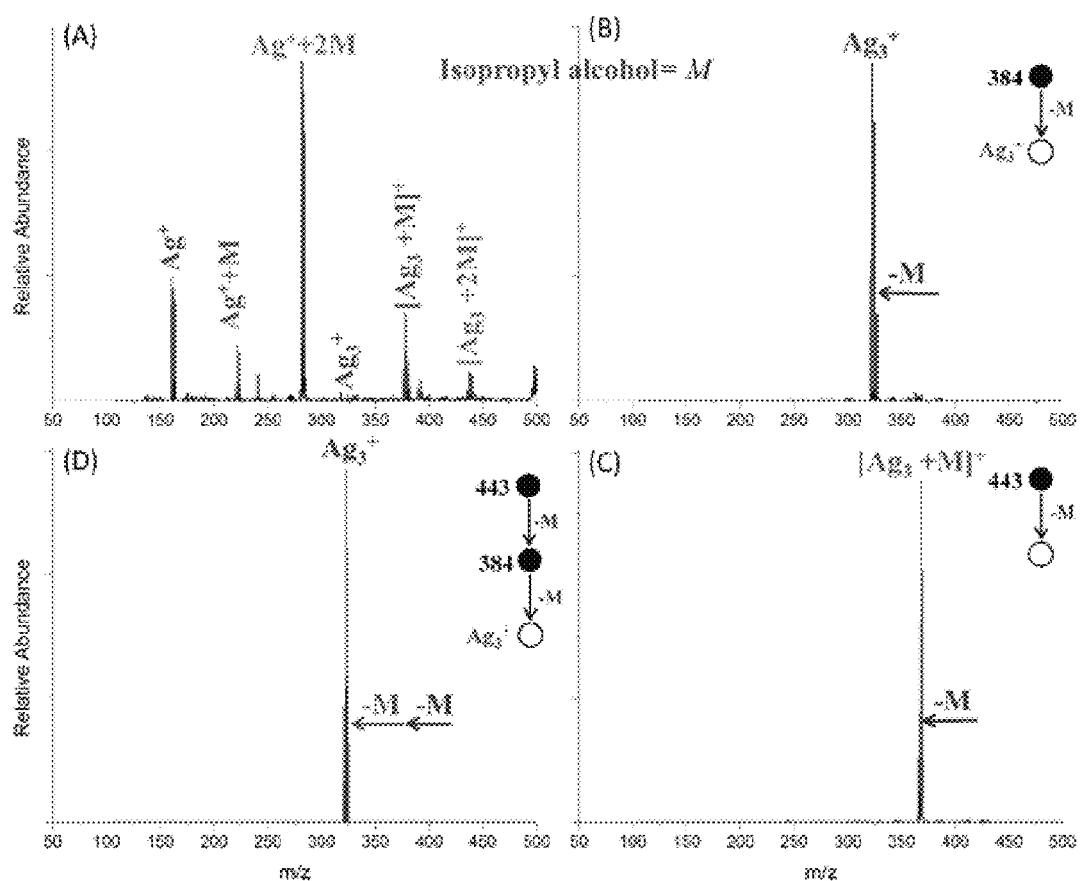
FIG. 15 panel A is a mass spectrum showing atmospheric ion/molecule reaction of silver clusters with isopropyl alcohol. Ligation of 1 and 2 isopropyl alcohol were observed with the silver trimer.

Systems of the invention were used to produce silver metal clusters that were directed to a vessel including isopropyl alcohol. The silver metal clusters reacted with the isopropyl alcohol. FIG. 15 panel A is a mass spectrum showing atmospheric ion/molecule reaction of silver clusters with isopropyl alcohol. Ligation of 1 and 2 isopropyl alcohol were observed with the silver trimer. FIG. 15 panel B shows $MS^2$ of m/z 384 confirming the ligation of 1 isopropyl alcohol. FIG. 15 panel C shows $MS^2$ of m/z 443 and FIG. 15 panel D shows $MS^3$ of m/z 384 confirming the ligation of two metal ligands.

Example 6

Functionalized Substrates and Methods of Making and Patterning Substrates

The example relates to functionalized substrates, such as substrates functionalized for surface enhanced Raman Spectroscopy, methods of making thereof, and methods of patterning surfaces.

Metallic nanoparticles have attractive properties in catalysis, photonics, and chemical sensing (Eustis et al., Chem. Rev. 2005, 105, 1547-1562; and Jain et al., Acc. Chem. Res. 2008, 41, 1578-1586). Raman spectroscopy is a powerful non-destructive technique (Biggs et al., Chem. Rev. 1999, 99, 2957) the sensitivity of which can be significantly improved through Surface enhanced or and tip enhanced Raman Scattering (SERS, TERS) (Jeanmaire et al., Journal of Electroanalytical Chemistry and Interfacial Electrochemistry 1977, 84, 1-20; Wang et al., Analyst 2013, 138, 3150-3157; and Stockle et al., Chem. Phys. Lett. 2000, 318, 131-136). The enhancement arises due to an analytes' proximity to intense localized fields created by nano tips, nanoparticles, or nano particle assemblies (Hao et al., J. Chem. Phys. 2004, 120, 357-366; Genov et al., Nano Lett. 2004, 4, 153-158; and Negri et al., Chem. Commun. 2014, 50, 2707-2710). The capability to modify, coat and pattern surfaces with nano structures is important, not only for SERS, but also for material functionalization (Nge et al., Journal of Materials Chemistry C 2013, 1, 5235-5243), in situ analysis (Li et al., Nature 2010, 464, 392-395), as well as large scale nano material fabrication (Wang et al., Anal. Chem. 2014). Conventional modified surfaces are constructed by delivering intact nanoparticles to the target locations via drop casting or spin coating (Xia et al., Journal of Vacuum Science & Technology A 2013, 31; Osberg et al., Adv. Mater. 2012, 24, 6065; Cyriac et al., Analyst 2012, 137, 1363-1369). However, the difficulty in positioning discrete particles with control over orientation, position, and degree of aggregation, means that drop casting of nanoparticles has not been widely used in high throughput SERS analysis. Immobilized and shell isolated nano systems (Huang et al., Nature 2010, 464, 392-395; and Greeneltch et al., Anal. Chem. 2013, 85, 2297-2303) do address these issues but tedious vacuum preparation procedures significantly increase the cost of such approaches.

Ion/surface collisions including or ion soft-landing has been used in fabricating surface structures under vacuum (Rauschenbach et al., Phys. Chem. C 2012, 116, 24977-24986; Lei et al., Science 2010, 328, 224-228; and Cyriac et al., Chem. Rev. 2012, 112, 5356-5411). Recently a metal electrolytic spray ionization deposition method (Li et al., Angew. Chem., Int. Ed. 2014, 53, 3147-3150) has been developed that is capable of generating noble metal ions directly from solid under ambient conditions as precursors for nanoparticle synthesis.

The example provides methods for in situ fabrication of SERS active spots and patterns by metal electrolytic spray ionization deposition to desired locations where they automatically yield assemblies of nanostructure. Metal electrolytic spray ionization deposition was used for surface fabrication of 2D patterned nano structures for surface-enhanced Raman spectroscopy (SERS). Silver nanoparticle (AgNP) containing spots were created in desired locations accurately using masks with appropriate patterns of apertures and with focusing of the ion spray by charge buildup on the edges of the apertures. No capping agent was used and the morphology and SERS activity of the NP structures were controlled by degrees of coverage of deposited ions. The NP structures were created either as sampling media, or directly on top of sample containing regions. The evenly distributed hot spots had a highest average enhancement factor of $5 \times 10^8$. The surfaces are SERS active using lasers of different wavelengths (532, 633, 785 nm).

Materials and Chemicals

The support surfaces used in this experiment included ITO slides, aluminum coated (~100 nm) microscope glass slides (Deposition Research Lab, St. Charles, Mo.), gold (120 nm) with Titanium (100 nm) adhesion layer coated microscope glass slide (Deposition Research Lab, St. Charles, Mo.), ITO coated glass slides (1.1 mm thickness, 1"×3", (Nanocs, N.Y., N.Y.)), heavy duty aluminum foil of 0.01 mm thickness (Durable Packaging International, Wheeling, Ill.), soft annealed copper foil of 0.05 mm thickness (McMaster-Carr, Elmhurst, Ill.). Silver foil, Stainless Steel foils, and gold foil of 0.01 mm thickness were purchased from Aldrich Chemical Company (Milwaukee, Wis.). P400 silicon carbide abrasive paper (Buehler, Ill.) were used to polish oxide layer and roughen surfaces when needed. TEM grids (Electron Microscopy Science) were used as received.

The metal electrodes used for MESID were assembled as previously described.[22] HPLC grade acetonitrile, methanol (Chromasolv, Sigma-Aldrich) was used in related experiments. Crystal violet, Rhodamine 6G (reagent grade, Sigma-Aldrich), was used as received.

Chemical Instrumentation

An ambient ionizing and deposition set up was constructed and used to accurately log the amount of ions delivered onto any collecting surface (Li et al., Angew. Chem., Int. Ed. 2014, 53, 3147-3150). Briefly, a wire-in nanoESI source were loaded with anhydrous acetonitrile subjected to a high voltage of ~1.5 kV. The ionic species generated by the ion source were checked by an Orbitrap mass spectrometer (LTQ Orbitrap XL, Thermo, Calif.) before and after deposition. Metal containing ions were directed to a grounded target surface. The recombination current through the ground was monitored and logged once every second. Target surfaces were grounded and positioned 5-10 mm away from the tip of the MESI emitter, static and under ambient condition. Monolayer coverage (ML) was calculated based on the total deposited charge and the size of spot. The sizes of the deposition spot was measured afterwards using electron or optical microscopes. Perforated masks was used when focused ion beam or specific spot sizes were needed. The ML was used to as a measure for the degree of surface modification.

The spatial distribution of ion current at the deposition surface was measured using an IonCCD detector system (O1 Analytical, College Station, Tex., USA), similar as previously described (Baird et al., Int. J. Mass Spectrom. 330, 277, 2012. The IonCCD is a pixelated charge detector consisting of an array of 21 μm wide TiN pads or pixels 1.5 mm in height, separated by 3 μm. When ions come in contact with the floated electrode surface they are neutralized and their charge is stored over a user determined integration time. Following the integration time the charge on each pixel is read out serially and the resulting signal is reported in the form of a digital number (dN). The detector array and associated electronics are housed in a stainless steel enclosure with a 1.5 mm wide, 49 mm long slit exposing the detector surface. A detailed description of the detector operation is provided by Hadjar et al. (J. Am. Soc. Mass Spectrom. 22, 612, 2011). Unless otherwise noted, integration time was set to 100 ms and 25 V was applied to the stainless steel housing of the detector.

An optical microscope (Olympus BX-51) equipped was used to obtain bright field, dark field and fluorescence image in various spectrum regions. The simultaneous single particle dark field imaging and spectra was measured using a hyperspectral assembly (Cytoviva HSI) comprising an Olympus BX-41 microscope fitted with a Dage high resolution camera and Specim V10E spectrometer (Bootharaju et al., Rsc Advances 2, 10048, 2012). The characteristic scanning range is from 400-1000 nm, divided into 462 bands which gives a spectral resolution of +/−1.5 nm. The relative scattering intensity of the particle is a determinant of its color with 640, 550 and 460 nm, assigned to red, green and blue respectively.

SEM images and EDAX data were taken on a FEI Philips XL-40 Scanning Electron Microscope with a Schottky field emission gun. High resolution TEM images of the samples were obtained using a JEOL 3010 instrument with a UHR pole piece. Specimens for TEM analysis were prepared by placing lacey carbon grid on top of the collecting surface. Several Raman instruments equipped with different lasers were used to evaluate prepared SERS active surfaces. The first one was an Alpha-SNOM 300 S confocal Raman microscope (WITec GmbH, Germany) with a 532 nm laser as excitation source. The large area scan was done on an area of 4 mm×4 mm with 200 spots per line. Large area optical image was taken using image stitch option in the software equipped with this Raman instrument. The second was an Alpha 300 confocal Raman microscope (WITec GmbH, Germany) with a 633 nm laser as excitation source. The third one was a near Infrared Raman imaging microscope (Olympus BX60) with a 785 nm laser. Raman signals were collected using objective lenses, laser power intensities and with an integration time denoted individually in each figure.

All the Raman spectra shown here is background corrected. The background correction was done using the WITec instrument provided software, initially the spectrum was fitted with a best fit polynomial and then that was subtracted from the original spectra. Raman images were generated based on the intensity of Raman peaks using the WITec software.

Enhancement Factors Calculation, Uniformity Evaluation and Other Considerations

The enhancement factor (EF) was calculated based on the measured Raman spectra. At first the SERS intensities were compared with normal Raman intensities, corrected for the number of molecules under the laser spot. The formula to measure the EF is given as (Stiles et al., Annu. Rev. Anal. Chem. 1, 601, 2008):

$$EF = \frac{I_{SERS}/N_{surface}}{I_{normal}/N_{bulk}}$$

$I_{SERS}$, $I_{normal}$, $N_{bulk}$, $N_{surface}$ are observed SERS intensities of arising from monolayer coating of analyte molecule (here, crystal violet (CV) or Rhodamine 6G (R6G)) on the Ag nanoparticle spot, Raman intensity of analyte molecule in absence of nanoparticle (normal Raman signal), number of analyte molecules excited under laser spot for bulk specimen and number of analyte molecules under the laser spot on Ag nanoparticles, respectively. $I_{SERS}$ and $I_{normal}$ were taken from the normalized (for power and acquisition time) intensity of C—H in plane bending mode (Raman shift at 1176 cm-1 for CV and 1365 cm$^{-1}$ for R6G). $N_{bulk}$ and $N_{surface}$ values are computed by using the formula given below.

$$N_{surface} = 4\pi r^2 \cdot C \cdot A \cdot N$$

where r, C, A, N are average particle radius of the Ag nanoparticles of the spot, surface density of the analyte monolayer, area of the laser spot and average number of particles per square micrometer area, respectively. The average particle radius r was taken (from SEM measurement) as 32 nm, surface density of analyte molecule C calculated as 105/μm$^2$, area of laser spot (50× objective, Numerical Aperture=0.55) diameter was 3 μm (A=7.1 μm$^2$), number of particles per square micrometer N is (from SEM measurement) 255.

$$N_{bulk} = N_A \cdot A \cdot h \cdot \rho / M;$$

A is area of the laser spot, h is penetration depth of the laser, p is density of the solid analyte (0.83 g/cm$^3$ in case of crystal violet), molecular weight of the analyte (in this work, 408 for crystal violet and 479 for Rhodamine 6G). The laser spot was 3 μm diameter; penetration depth of laser h was taken as 20 μm.

Using these parameters and the previously quoted equation, the highest EF for the AgNP structured copper foil was calculated to be 3.8×10$^{10}$, Table 2 below. Al, Au foils, was calculated to be 6.9×10$^6$ and 2.2×10$^7$.

TABLE 2

Average Signal Intensity and Enhancement Factor for AgNP on different materials

| Support Material | Highest Peak Intensity (1176 cm$^{-1}$) | EF |
|---|---|---|
| Copper Foil | 12921 | 3.86E+07 |
| Gold foil | 7310 | 2.18E+07 |
| Aluminum Foil | 2302 | 6.88E+06 |
| Copper Tape | 3731 | 1.11E+07 |
| Brass foil | 40 | 1.19E+05 |
| Stainless Steel Foil | 181 | 5.41E+05 |
| Silver foil | n.a. | n.a. |
| ITO coated slide | 30 | 8.96E+04 |
| Aluminum coated slide | 864 | 2.58E+06 |
| Penny coin AgNP first | 590 | 1.76E+06 |
| Penny coin Sample first | 471 | 1.41E+06 |
| in situ deposition on sample | 313 | 9.35E+05 |

Other Considerations on the Enhancement Factor: Resonance Contribution and Laser Induced Damage Molecular electronic resonance Raman (RR) and surface-enhanced Raman effects was observed to increase Raman signal synergistically. Crystal violet has a wide absorption spectrum with an absorbance maximum ranging from 420 to 600 nm depending on the environment pH. The resonance Raman contribution to enhancement factor (EFRR) can be as much as 10$^{5-7}$ when the laser wavelengths meet the electronic excitation energy of the analytes (Dieringer et al., J. Am. Chem. Soc. 131, 849, 2009); and Kleinman et al., J. Am. Chem. Soc. 133, 4115, 2011). This might be one reason for the extremely high signal intensity when C.V. sample were probed under the 532 laser, as showing in the following figure. This may be a contributing factor that complicates the obtained SERS enhancement factor.

The 785 nm laser is far from the resonance of crystal violet. These experiment combinations shall give enhancement factors without interference of resonance contribution. Shown in FIG. 19, panel C, near IR laser gave average enhancement factor of $2\times10^5$. This decrease, however, may also be due to the different interaction between created nanostructures with the near IR laser. For this reason, R6G was tested under 633 nm (which is far from R6G's resonance) for better comparison. The result is shown in the below FIG. 20 as well as summarized in Table 3 below.

Another interesting phenomenon observed this SERS experiment is that the high SERS signal always experienced a decrease during recording of the spectrum. If the sample was slightly moved, the signal would jump (sometime beyond the CCD saturation level) to a high value and then immediately decrease within the 1 second integration time. In the imaging mode, Raman spectra over each pixel were taken with 0.01 second integration time and then the sample stage moved to next pixel. Much higher signal intensities, as well as enhancement factors was obtained in this mode.

Figure 20:
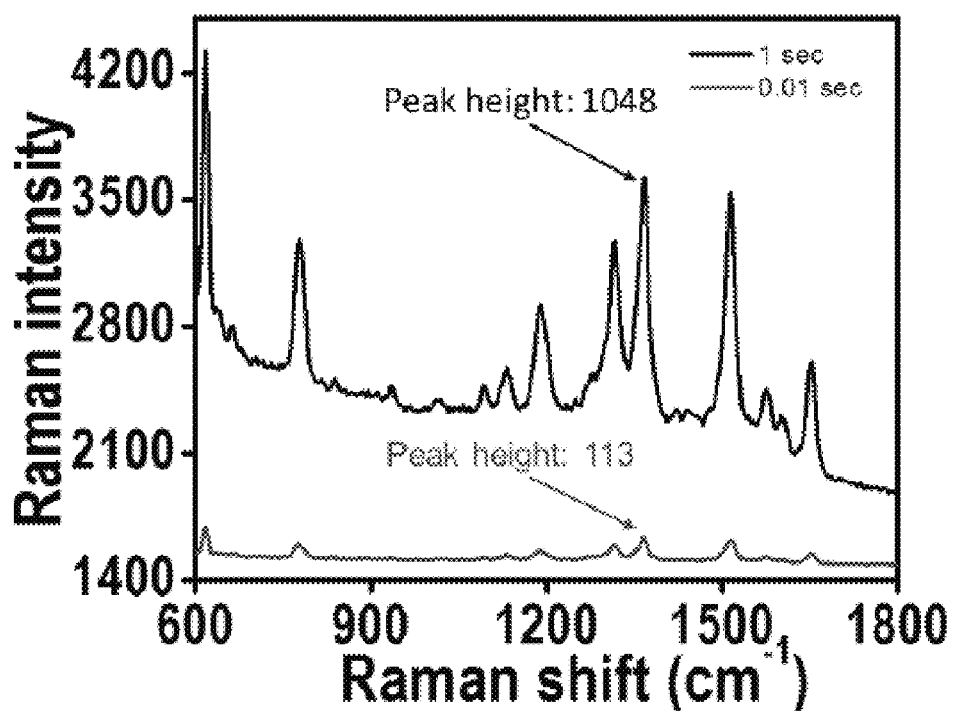
FIG. 20 is a SERS spectra of R6G (10$^5$ per μm$^2$) on top of AgNP nanostructure on top of copper foil under excitation of 633 nm lasers. The two spectra were taken with (top) 1 second (bottom) 0.01 second recording time from the same spot region. The peak height (relative to baseline) of 1365 cm$^{-1}$ band were labeled for spectra.
Figure 21:
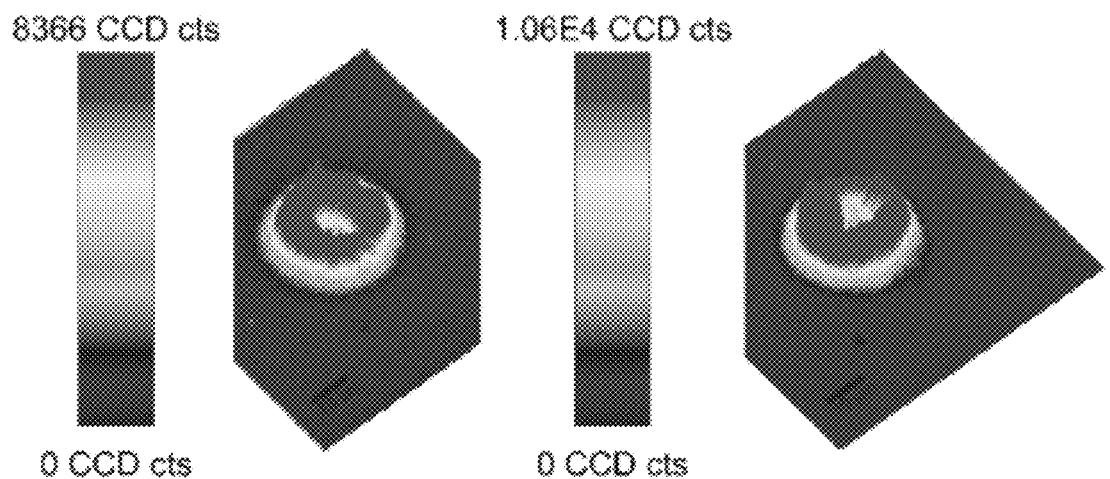
FIG. 21 shows Raman imaging of two spots created in an array. Crystal violet (105 per μm$^2$) was applied over the whole region by drop casting on top of copper foil. Raman signal of CV can only be observed where AgNP spots were fabricated. The uniformity of the array is demonstrated by the similarity of the Raman images of CV from two randomly selected spots in this array pattern. The volcano shape of the Raman imaging might be due to the flux distribution of depositing ion plume when focused to 20 μm.

Showing in FIG. 20, a highest signal found in the is integration scans is only 9 times higher than a highest signal in 0.01 s integration scans. This could be the result of thermal desorption of the molecule from the hotspot driven by laser, or the result of laser induced melting of nanoparticles since no capping agent was used to protect the AgNPs. Even this 0.01 integration time gave a lot better results, most of the EF reported in Table 1 are still based on 1 second integration time with the consideration that most Raman spectrometers are built without image scanning function.

In summary, Resonance contribution may have brought up the overall enhancement factor but laser induced damage could have brought down the actual enhancement factor. Future modification on the surface may give even better performance for SERS applications.

SERS Uniformity of the Modified Surfaces

For real applications of SERS, the surface uniformity is an important measure that determines the robustness of the experiment. Densely and evenly distributed hotspots would be ideal for rapid Raman analysis. The uniformity of the modified surface were evaluated by repeating measurements on randomly selected regions in the same spot. The corresponding values for the AgNP structures built on three different support materials were summarized in Table 3.

TABLE 3

SERS intensity of band 11 cm$^{-1}$ in different regions of the spots, 10 ML Ag coverage, 8.6 mW, 633 nm laser excitation

| Support Material | region 1 | region 2 | region 3 | region 4 | region 5 | mean | % RSD |
|---|---|---|---|---|---|---|---|
| Copper Foil | 9747 | 12733 | 11510 | 12921 | 11204 | 11623 | 11% |
| Al foil | 2302 | 1213 | 2173 | 1690 | 1739 | 1823 | 24% |
| Au foil | 7310 | 5324 | 4880 | 6160 | 5259 | 5737 | 17% |

For AgNP arrays composed of small spots, uniformity evaluation was done by Raman imaging of the different areas composing the spot. As shown in the below FIG. 21, these spots are effectively identical for SERS purposes.

In sum, the net enhancement signal is very uniform. Considering the variance of analyte's surface distribution brought by dropcasting, the SERS uniformity and reproducibility of the prepared surface is exceptional.

SEM Images of Ag$^+$ Modified Surfaces

Figure 27:
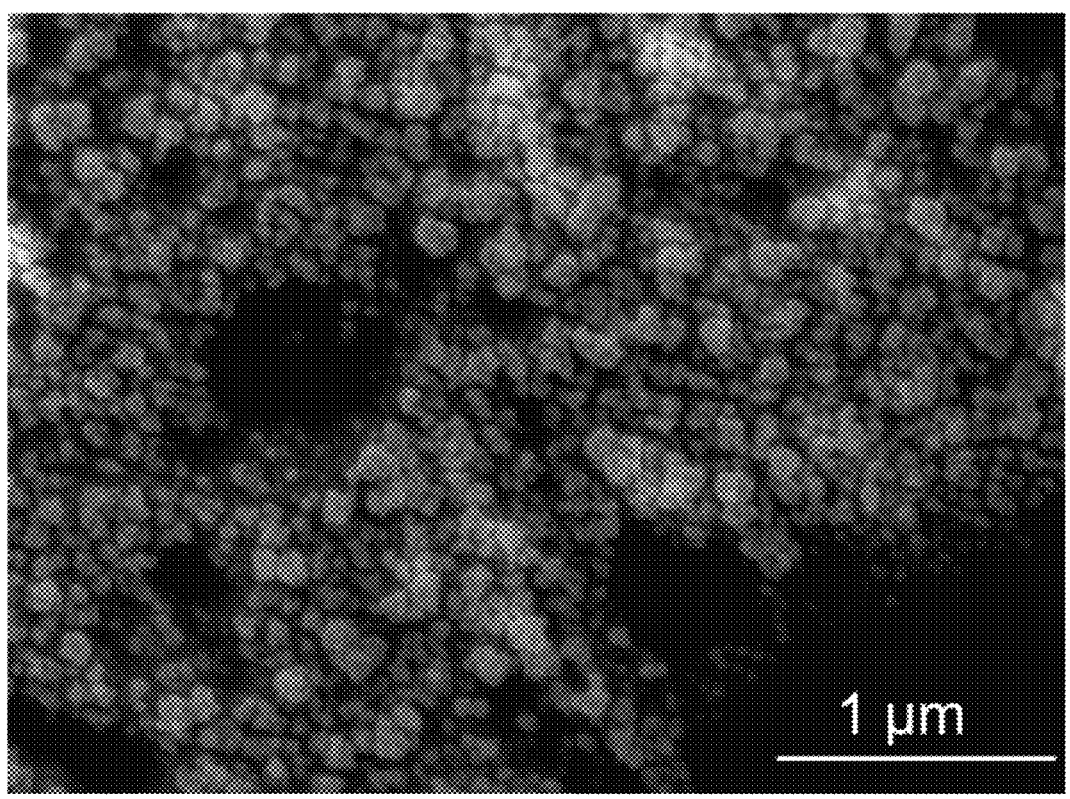
FIG. 27 is an image showing AgNP structures created by monolayer coverage of $Ag^+$ deposited on top of gold foil. This surface has by far the highest SERS performance. At the same time, the AgNP on this surface is also the one most susceptible to electron beam induced melting/aggregation during SEM image.
Figure 28:
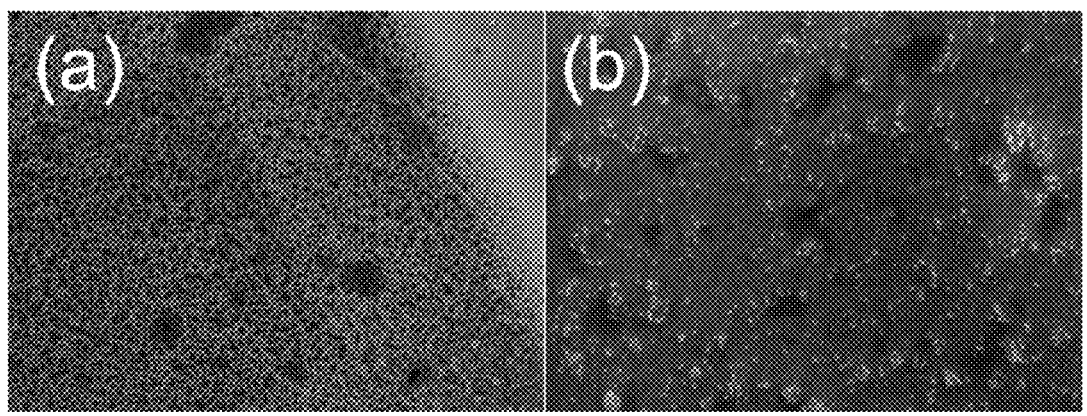
FIG. 28 panels A-B is an image showing AgNP structures created by on top of (panel A) ITO coated slide and (panel B) aluminum coated glass slide.

A series of surfaces were tested as supported materials for the in situ preparation of AgNP by metal electrolytic spray ionization deposition. Different SERS performance were found for the different support materials as summarized in Table 2. These modified surfaces show different morphologies as imaged by scanning electron microscope. Even among the "good" substrates, different morphologies can be observed. See FIGS. 22 and 27-28.

Figure 29:
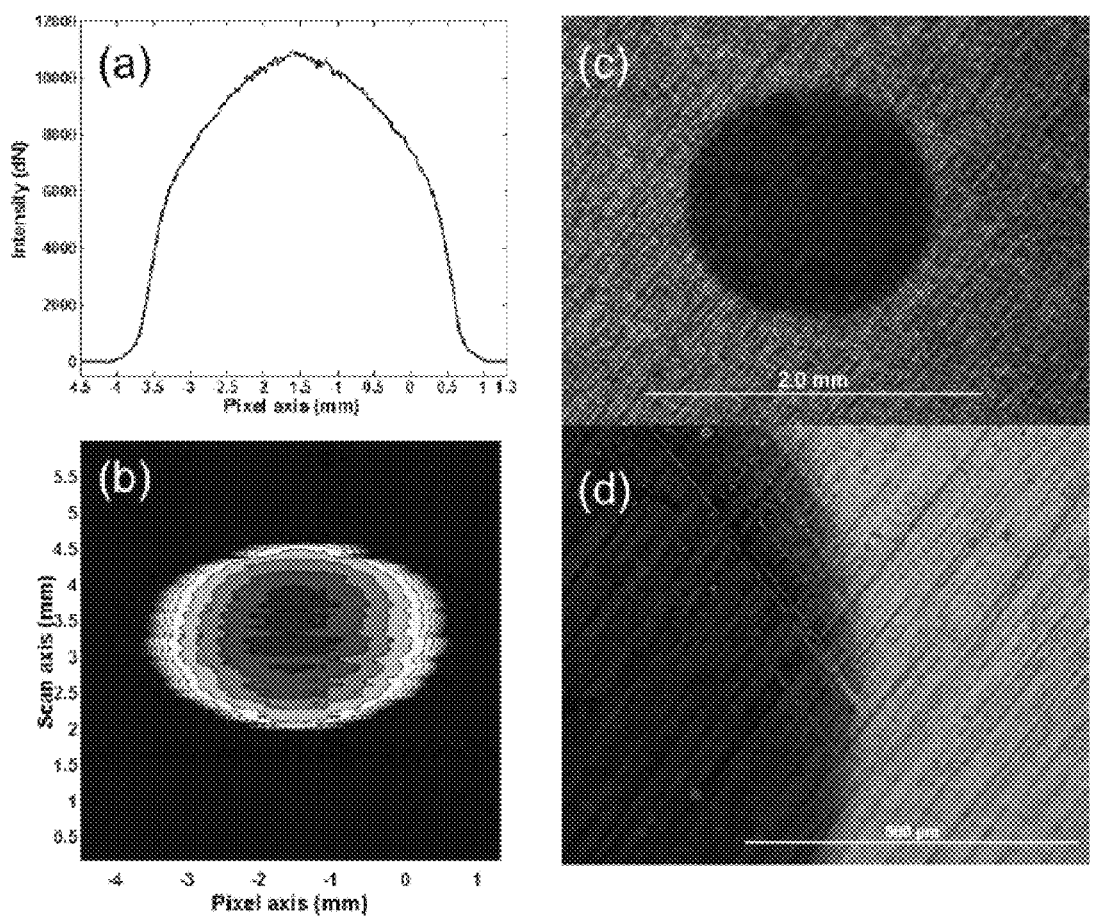
FIG. 29 panel A shows a cross section scan.

The Deposition Plume: Spatial Flux Distribution, Coverage, Morphology and SERS Signal Once loaded with anhydrous acetonitrile and being in contact with high voltage, the metal electrolysis spray ionization (MESI) source readily generated silver containing ions as dominating ion signal observed by an atmospheric pressure sampling mass analyzer, as discussed previously (Li et al., Angew. Chem., Int. Ed. 2014, 53, 3147-3150). The diameter of the charged droplet emitter tips were typically 1-5 μm. After progression in ambient air along the electric gradient for ~5 mm, the spray plume's diameter expanded to 1-5 mm. The metal ions' distribution in this expanded plume may result in an uneven distribution of precursor ion concentration on the collecting surfaces. Mapped by an Ion CCD (FIG. 29 panels A-B), for a spray plume of ~3 mm diameter, the current maximize in the center and dropped slowly less than 30% for the first 1.5 mm outward from the center. For the next 1 mm, the current dropped a lot more rapidly and accounted for the rest 70%. For this reason, it was assumed a uniform distribution of deposited metal ions for most areas inside the deposition circle. This "uniform in the center" assumption is largely valid as observed by optical and electron microscopes. (FIG. 29 panels B and D and FIG. 21) Monolayer coverage was controlled by deposition time with an estimation based on deposition current and spot size. The actual monolayer coverage of each experiment was calculated afterwards with the accurately measured spot sizes and the deposition currents logged by a computerized system (Li et al., Angew. Chem., Int. Ed. 2014, 53, 3147-3150).

Hyperspectral Imaging of Prepared Nanoparticles and Aggregates

Figure 30:
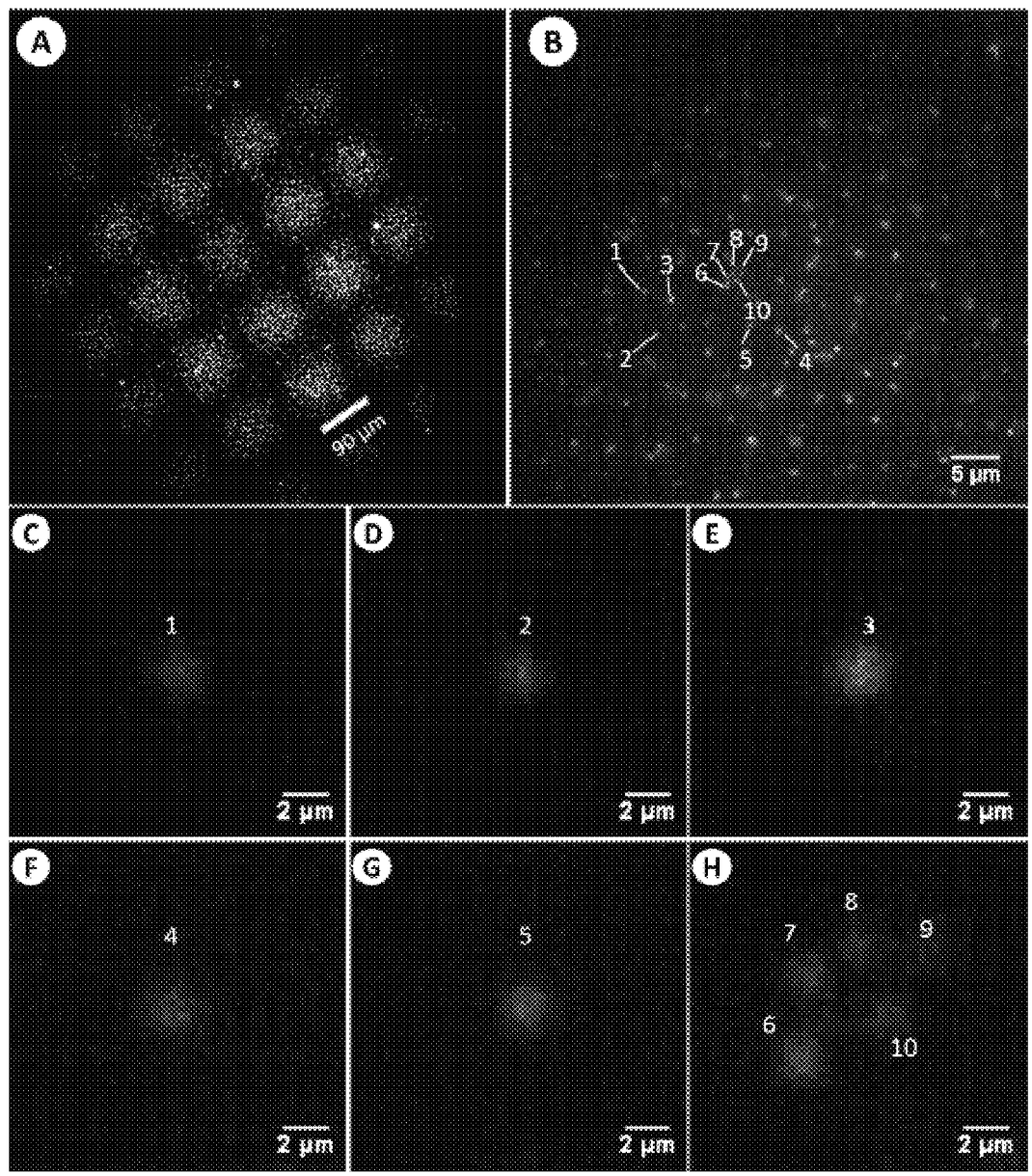
FIG. 30 panels A-H are images showing particles and aggregates with a range of plasmon scatterings were generated by this one pot ion deposition method.
Figure 31:
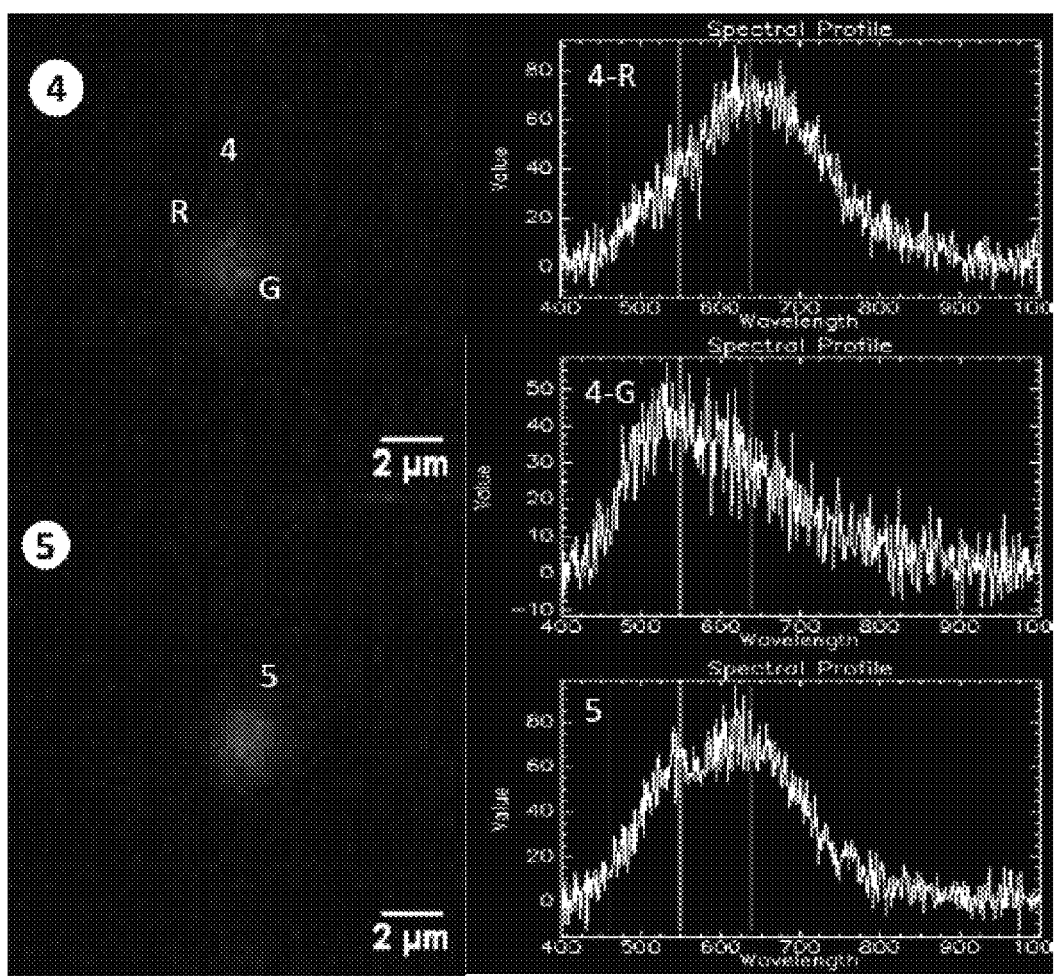
FIG. 31 shows different scattered spectra from the selected particles and aggregates. With 10 ML coverage, the scattering spectra have wide peaks ranging between 510 nm and 650 nm, suggesting a broad range of surface plasmon resonance of surface prepared similarly. This "fuzziness" allowed for SERS activity for lasers with multiple wavelengths.

Surface plasmon resonance (SPR) Dark filed hyper spectra imaging (HSI) scattering spectrum was carried out to analyze one sample of aggregated nanoparticle prepared by depositing ~10 ML silver ions (FIGS. 30-31).

Ion Beam Focusing and Creating Surface Patterns Using Metal Electrolytic Spray Ionization Deposition with Masks Static patterns of nanoparticle containing spots was created by putting masks between the ion emitter and the deposition targets. Grounded conductive mask (FIGS. 24-26) creates a negative pattern by simply blocking ions depositing to the positive regions. Non-conductive and floated conductive masks, however, provides additional focusing effect that gives higher flux and smaller (than the mask holes' dimensions) spots.

Figure 32A:
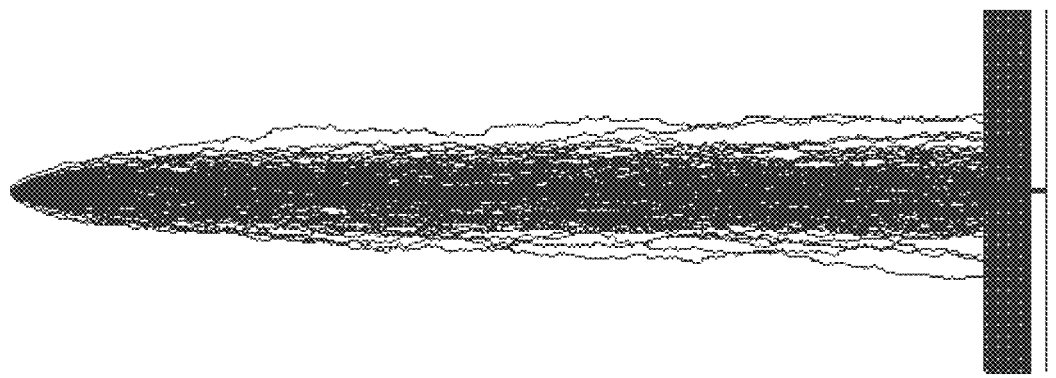
FIG. 32A shows that ions (279 m/z) originating at the nanoESI tip diffuse outward and are subsequently focused to the deposition surface by the conductive mask through a 200 μm hole. Potentials applied to the nanoESI spray tip, and deposition surface were 1500V, 1000V, and 0V respectively.
Figure 32B:
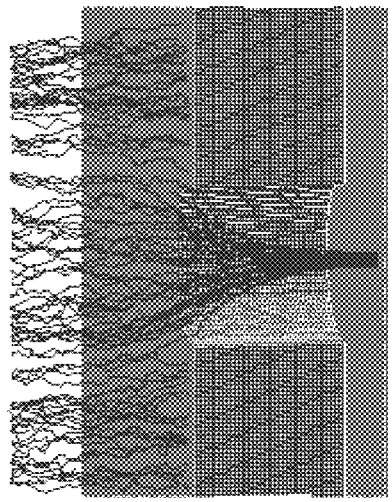
FIG. 32B is a close up view demonstrating ion (m/z 279) focusing occurring at the mask electrode. Ions were initialized 250 μm from the mask electrode. Spot size at the deposition surface is approximately 20 μm. Focusing causes a 100× decrease in beam cross section.

In a particular investigation, ion optical simulations were performed using the ray tracing program SIMION to test the expectation that directing a spray of ions towards a small aperture in a non-conducting surface would build up change on the surface as a result of ions landing there and that this potential would act to focus the ions that move through the aperture. A charge of 1000 v was assumed and the initial ion energy was a few tens of volts. The results (FIGS. 32A-B) show that the final spot size was 100 times smaller than the aperture diameter, indicating very strong focusing.

What is claimed is:

1. A method for providing droplets comprising metal ions, the method comprising:
   contacting a solvent to a metal to produce solvated metal ions;
   applying voltage to produce solvent droplets comprising the solvated metal ions; and
   directing the solvent droplets comprising the solvated metal ions to a reactive surface.

2. The method according to claim 1, wherein the solvent droplets are directed to the target by a force selected from the group consisting of: an electric field, a gas flow, and a combination thereof.

3. The method according to claim 1, wherein the reactive surface comprises a cathode and interaction of the solvated metal ions with the cathode reduces the metal ions to a neutral state.

4. The method according to claim 3, wherein the reactive surface further comprises a cathode solvent.

5. The method according to claim 1, wherein the reactive surface comprises a reducing reagent.

6. The method according to claim 1, further comprising contacting a capping ligand to the metal ions on the reactive surface.

7. The method according to claim 1, wherein interaction of the solvated metal ions with the reactive surface generates at least one metal containing product.

8. The method according to claim 7, wherein the metal containing product is a nanoparticle.

9. A method for providing droplets comprising metal ions, the method comprising:
    contacting a solvent to a metal to produce solvated metal ions;
    applying voltage to produce solvent droplets comprising the solvated metal ions; and
    directing the solvent droplets comprising the solvated metal ions to a reaction mixture.

10. The method according to claim 9, wherein contact of the metal ions to the reaction mixture catalyzes a reaction in the reaction mixture.

11. The method according to claim 10, wherein the reaction in the reaction mixture occurs in an ambient environment.

12. A method for producing metal containing nanoparticles, the method comprising:
    providing a metal containing anode in contact with a solvent to produce solvated metal ions;
    applying voltage to the anode, thereby producing solvent droplets comprising solvated metal ions;
    directing the solvent droplets comprising the solvated metal ions to a reactive surface, wherein interaction of the solvated metal ions with the reactive surface produces metallic nanoparticles.

13. A system for producing metal containing nanoparticles, the system comprising:
    a droplet emitter comprises a metal containing anode and a solvent vessel operably coupled to the anode;
    a high voltage source coupled to the droplet emitter; and
    a reactive surface positioned to receive droplets comprising metal ions produced by the droplet emitter, wherein the reactive surface is functionalized to reduce solvated metal ions that interact with the surface to thereby produce metal containing nanoparticles on the surface.

14. The system according to claim 13, wherein the reactive surface comprises a cathode.

15. The system according to claim 13, wherein the reactive surface comprises a reducing agent.

16. The system according to claim 13, wherein the system further comprises a gas flow generating device that is operably coupled to the droplet emitter.

17. The system according to claim 13, further comprising a mass analyzer positioned between the droplet emitted and the reactive surface.

18. The system according to claim 17, wherein the mass analyzer allows for spatial selective soft landing of the metal ions onto the reactive surface.

* * * * *